(12) United States Patent
Hedin

(10) Patent No.: US 11,561,127 B2
(45) Date of Patent: *Jan. 24, 2023

(54) APPARATUS FOR ANALYSING THE CONDITION OF A MACHINE HAVING A ROTATING PART

(71) Applicant: S.P.M. Instrument AB, Strangnas (SE)

(72) Inventor: Lars-Olov Hedin, Hallstahammar (SE)

(73) Assignee: S.P.M. Instrument AB, Strangnas (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,208

(22) Filed: Jun. 7, 2019

(65) Prior Publication Data

US 2019/0391004 A1 Dec. 26, 2019

Related U.S. Application Data

(63) Continuation of application No. 15/010,109, filed on Jan. 29, 2016, now Pat. No. 10,330,523, which is a (Continued)

(30) Foreign Application Priority Data

Jan. 18, 2010 (SE) .................................. 1000045-3
Jul. 11, 2010 (SE) .................................. 1000631-0

(51) Int. Cl.
*G01M 13/045* (2019.01)
*G01H 1/00* (2006.01)

(52) U.S. Cl.
CPC .......... *G01H 1/003* (2013.01); *G01M 13/045* (2013.01)

(58) Field of Classification Search
CPC ............................. G01H 1/003; G01M 13/045
(Continued)

(56) References Cited

U.S. PATENT DOCUMENTS 3,554,012 A 1/1971 Sohoel
4,528,852 A 7/1985 Sohoel
(Continued)

FOREIGN PATENT DOCUMENTS

CN 1926413 3/2007
DE 3424692 2/1986
(Continued)

OTHER PUBLICATIONS

NPL_ 208_1 Search Results, Jul. 9, 2021, 1 pp. (year: 2021).*
(Continued)

*Primary Examiner* — John E Breene
*Assistant Examiner* — Xiuqin Sun
(74) *Attorney, Agent, or Firm* — Knobbe Martens Olson & Bear, LLP

(57) ABSTRACT

A method of operating an apparatus for analysing the condition of a machine having a part rotating with a speed of rotation, includes receiving a first digital signal dependent on mechanical vibrations emanating from rotation of the part, analyzing the first digital signal So as to detect peak amplitude values during a finite time period, the finite time period corresponding to a certain amount of revolution of the part, the certain amount of revolution corresponding to more than one revolution of the monitored rotatable part, defining amplitude ranges, sorting the detected peak amplitude values into corresponding amplitude ranges so as to reflect occurrence of detected peak amplitude values within the plurality of amplitude ranges, and estimating a representative peak amplitude value in dependence on the sorted peak amplitude values and the certain amount.

19 Claims, 14 Drawing Sheets

Related U.S. Application Data continuation of application No. 13/522,023, filed as application No. PCT/SE2011/050035 on Jan. 13, 2011, now Pat. No. 9,279,715.

(58) Field of Classification Search
USPC .......................................................... 73/660
See application file for complete search history.

(56) References Cited

U.S. PATENT DOCUMENTS

| | | | |
|---|---|---|---|
| 4,912,661 | A | 3/1990 | Potter |
| 4,991,442 | A | 2/1991 | Matsumoto |
| 5,201,292 | A | 4/1993 | Grajski et al. |
| 5,258,923 | A | 11/1993 | Imam et al. |
| 5,365,787 | A | 11/1994 | Hernandez et al. |
| 5,445,028 | A | 8/1995 | Bianchi et al. |
| 5,633,811 | A | 5/1997 | Canada et al. |
| 5,852,793 | A * | 12/1998 | Board .................... G01H 1/003 702/56 |
| 5,870,699 | A | 2/1999 | Canada et al. |
| 5,895,857 | A | 4/1999 | Robinson et al. |
| 6,053,047 | A * | 4/2000 | Dister ................. G01M 13/028 73/593 |
| 6,332,116 | B1 | 12/2001 | Qian et al. |
| 6,351,713 | B1 | 2/2002 | Board et al. |
| 6,351,714 | B1 | 2/2002 | Meier |
| 6,560,566 | B1 | 5/2003 | Lysen |
| 6,591,682 | B1 | 7/2003 | Lysen |
| 6,618,128 | B2 | 9/2003 | Van Voorhis et al. |
| 6,801,864 | B2 | 10/2004 | Miller |
| 6,874,364 | B1 | 4/2005 | Campbell et al. |
| 7,010,445 | B2 | 3/2006 | Battenberg et al. |
| 7,133,801 | B2 | 11/2006 | Song |
| 7,136,794 | B1 | 11/2006 | Bechhoefer |
| 7,505,852 | B2 | 3/2009 | Board |
| 7,640,139 | B2 | 12/2009 | Sahara et al. |
| 7,949,496 | B2 | 5/2011 | Lindberg et al. |
| 8,810,396 | B2 | 8/2014 | Hedin |
| 8,812,265 | B2 | 8/2014 | Hedin |
| 9,279,715 | B2 | 3/2016 | Hedin |
| 10,330,523 | B2 * | 6/2019 | Hedin .................... G01H 1/003 |
| 2003/0130811 | A1 | 7/2003 | Boerhout |
| 2003/0182071 | A1 | 9/2003 | Ditommaso et al. |
| 2004/0083009 | A1 | 4/2004 | Curless et al. |
| 2004/0101048 | A1 | 5/2004 | Paris |
| 2004/0199348 | A1 | 10/2004 | Hitchcock et al. |
| 2005/0209811 | A1 | 9/2005 | Lindberg et al. |
| 2005/0246150 | A1 | 11/2005 | Shiromaru et al. |
| 2006/0150738 | A1 | 7/2006 | Leigh |
| 2007/0033785 | A1 * | 2/2007 | Kohring ............... G05B 19/406 29/27 C |
| 2007/0282545 | A1 | 12/2007 | Board |
| 2008/0033695 | A1 | 2/2008 | Sahara et al. |
| 2009/0164142 | A1 | 6/2009 | Studer et al. |
| 2009/0193900 | A1 | 8/2009 | Janssens et al. |
| 2010/0288051 | A9 | 11/2010 | Janssens et al. |
| 2011/0285532 | A1 | 11/2011 | Hedin |
| 2011/0295557 | A1 | 12/2011 | Hedin |
| 2014/0372079 | A1 | 12/2014 | Hedin |

FOREIGN PATENT DOCUMENTS

| | | |
|---|---|---|
| EP | 0107178 | 5/1984 |
| EP | 1477783 | 11/2004 |
| EP | 1513254 | 3/2005 |
| GB | 2190198 | 11/1987 |
| GB | 2451310 | 1/2009 |
| JP | 60195426 | 10/1985 |
| JP | 1-127934 | 5/1989 |
| JP | 01178814 | 7/1989 |
| JP | 04279826 | 10/1992 |
| WO | WO 95/13655 | 5/1995 |
| WO | WO 95/27183 | 10/1995 |
| WO | WO 96/05486 | 2/1996 |
| WO | WO 98/01831 | 1/1998 |
| WO | WO 00/04361 | 1/2000 |
| WO | WO 01/03840 | 1/2001 |
| WO | WO 02/073150 | 9/2002 |
| WO | WO 03/062766 | 7/2003 |
| WO | WO 2007/137132 | 11/2007 |
| WO | WO 2010/07645 | 7/2010 |
| WO | WO 2010/074648 | 7/2010 |

OTHER PUBLICATIONS

NPL_ 208_2 Search Results, Jul. 9, 2021, 1 pp. (year: 2021).*
Jason Mais, Spectrum Analysis—The key features of analyzing spectra, https://www.skf.com/binaries/pub12/Images/0901d1968024acef-CM5118-EN-Spectrum-Analysis_tcm_12-113997.pdf, viewed online on Apr. 20, 2022, published on May 2002 (Year: 2002).*
John Renwick, Condition Monitoring of Machinery Using Computerized Vibration Signature Analysis, IEEE Transactions On Industry Applications, vol. IA-20, No. 3, May/Jun. 1984, pp. 519-527 (Year: 1984).*
China Office Action dated Nov. 23, 2015; Application No. 201380007381X.
Extended European Search Report, dated Sep. 2, 2015; Application No. 13744257.0.
Extended European Search Report, dated Sep. 16, 2015; Application No. 12810816.4.
James Lundy, "Detecting Lubrication Problems using Shock Pulse", Lubrication & Fluid Power, Feb. 2006.
International Search Report, dated Jun. 7, 2011, from corresponding PCT application.
Eurasian Office Action, dated May 15, 2014, from corresponding Eurasian application.
Autocorrelation from Wikipedia, 2009, http://en.wikipedia.org/wiki/autocorrelation, pp. 1-6.
Autocorrelation—Wikipedia, the free encyclopedia, Dec. 12, 2008, p. 2-6, http://en.wikipedia.org/wiki/Autocorrelation.
Chang et al., "A Novel Envelope Detector for High-Frame Rate, High-Frequency Ultrasound Imaging", IEEE Transactions on Ultrasonics, Ferroelectrics, and Frequency Control, 2007, vol. 54, No. 9, pp. 1792-1801.
Joe Dominick, "PeakVue as Part of a Reliability Based Maintenance Program", Emerson Process Management—CSI, DoctorKnow® Application Paper, 2010 pp. 1-15.
Elliott et al., "13.2 Correlation and Autocorrelation Using the FFT", Fast Transforms: Algorithms, Analyses, Applications *New York: Academic Press), 1982, pp. 545-547.
Andrew Milman, "Mathematical Principles of Remote Sensing: Making Inferences from Noisy Data", Sleeping Bear Press, Michigan, 1999, pp. 215-233.
James C. Robinson, "Autocorrelation as a Diagnostic Tool", 2007, pp. 1-22.
Robinson et al., "How Advanced Analysis Identifies Lubrication Problems", Machinery Health, Pumps & Systems, 2007, pp. 66-67.
Oct. 17, 2017, EP communication issued for related EP application No. 11733155.3.

* cited by examiner

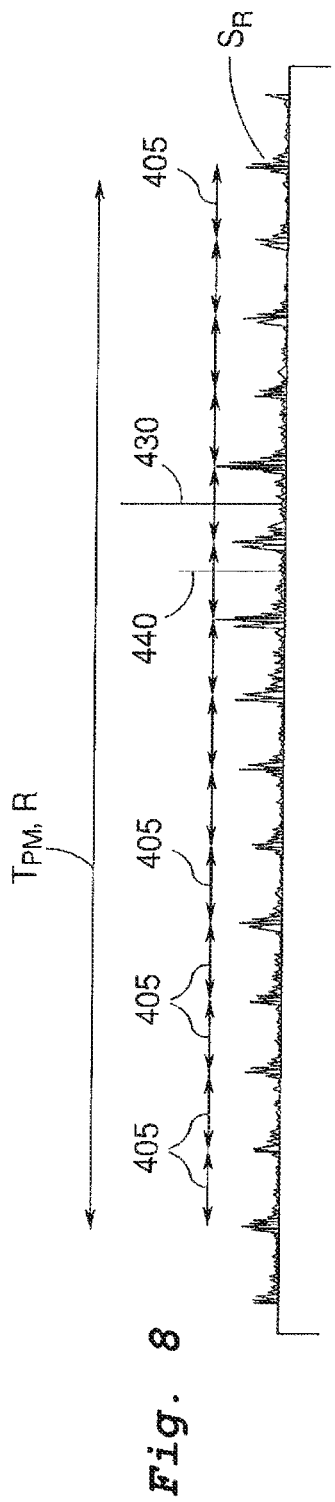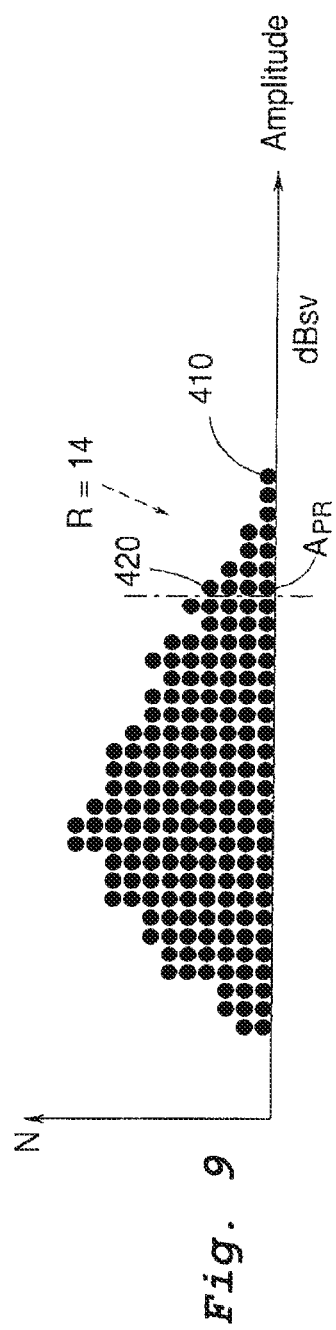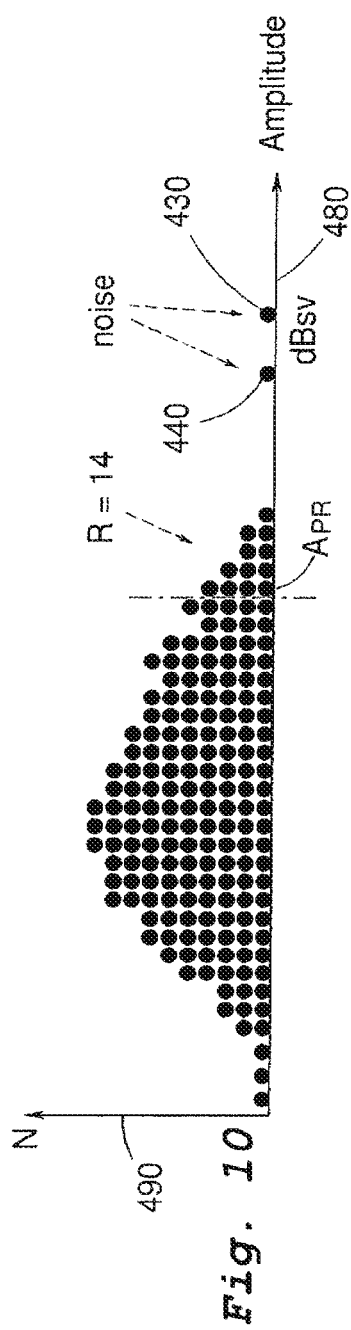

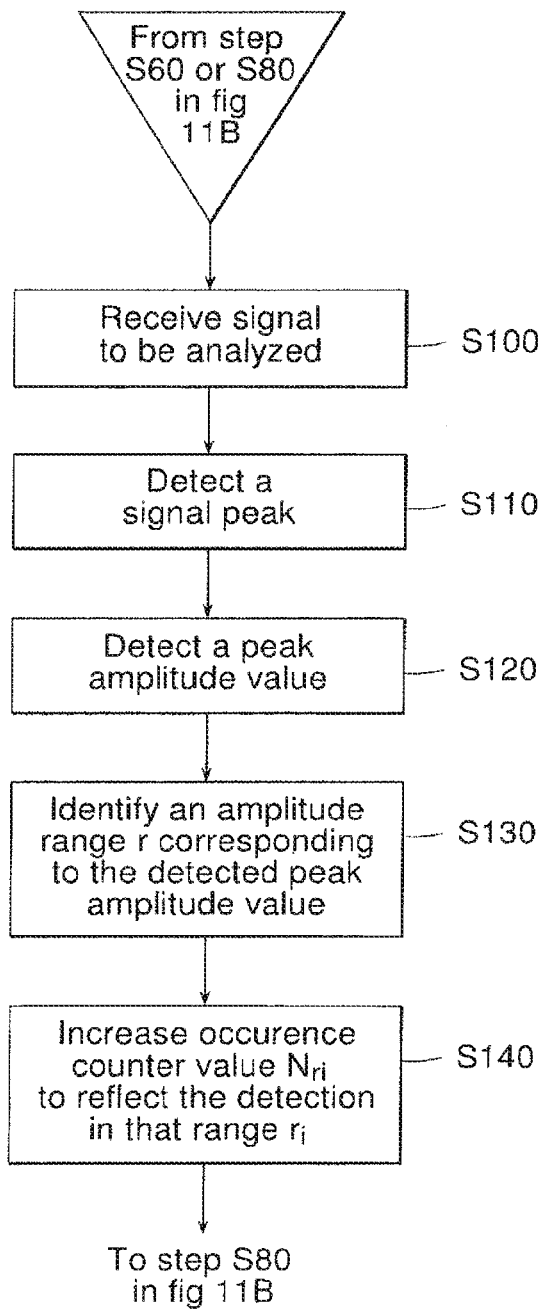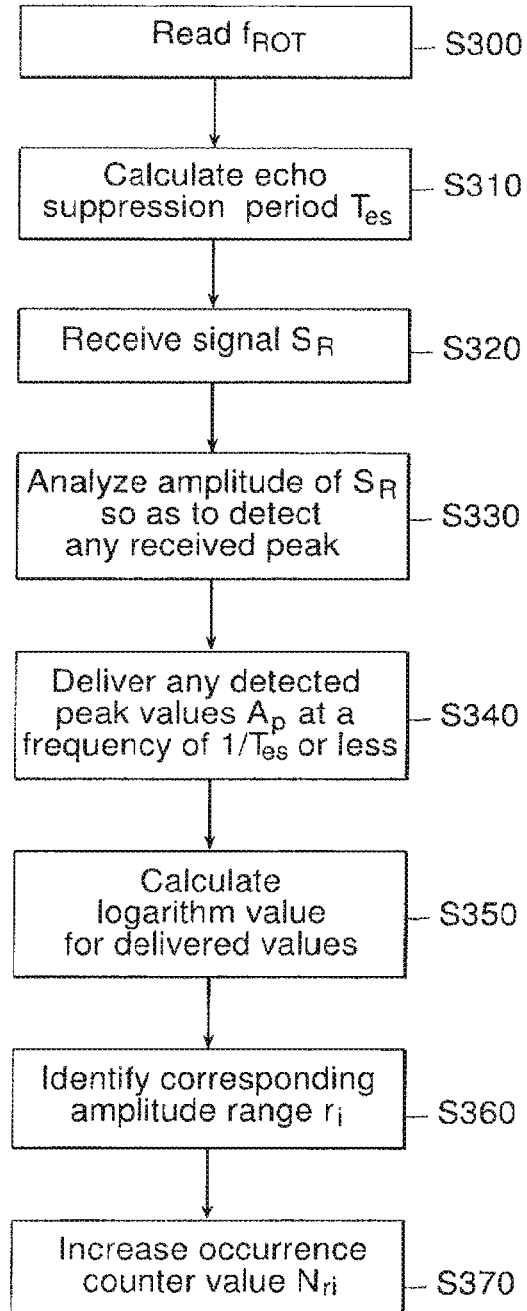
Fig. 12A
Fig. 12B

APPARATUS FOR ANALYSING THE CONDITION OF A MACHINE HAVING A ROTATING PART

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to a method for analysing the condition of a machine, and to an apparatus for analysing the condition of a machine. The invention also relates to a system including such an apparatus and to a method of operating Such an apparatus. The invention also relates to a computer program for causing a computer to perform an analysis function.

Description of the Related Art

Machines with moving parts are subject to wear passage of time, which often causes the condition with the of the machine to deteriorate. Examples of such machines with movable parts are motors, pumps, generators, compressors, lathes and CNC-machines. The movable parts may comprise a shaft and bearings.

In order to prevent machine failure, such machines should be subject to maintenance, depending on the condition of the machine. Therefore the operating condition of such a machine is preferably evaluated from time to time. The operating condition can be determined by measuring vibrations emanating from a bearing or by measuring temperature on the casing of the machine, which temperatures are dependent on the operating condition of the bearing. Such condition checks of machines with rotating or other moving parts are of great significance for safety and also for the length of the life of such machines. It is known to manually perform such measurements on machines. This ordinarily is done by an operator with the help of a measuring instrument performing measurements at measuring points on one or several machines.

A number of commercial instruments are available, which rely on the fact that defects in rolling-element bearings generate short pulses, usually called shock pulses. A shock pulse measuring apparatus may generate information indicative of the condition of a bearing or a machine.

WO 03062766 discloses a machine having a measuring point and a shaft with a certain shaft diameter, wherein the shaft can rotate when the machine is in use. WO 03062766 also discloses an apparatus for analysing the condition of a machine having a rotating shaft. The disclosed apparatus has a sensor for producing a measured value indicating vibration at a measuring point. The apparatus disclosed in WO 03062766 has a data processor and a memory. The memory may store program code which, when run on the data processor, will cause the analysis apparatus to perform a Machine Condition Monitoring function. Such a Machine Condition Monitoring function may include shock pulse measuring.

SUMMARY OF THE INVENTION

An aspect of the invention relates to the problem of ng an improved method and an improved apparatus provide for analysis of the condition of a machine having a rotating part.

This problem is addressed by a method of operating an apparatus for analysing the condition of a machine having a part rotating with a speed of rotation ($f_{ROT}$), comprising the steps of:

receiving a first digital signal ($S_{RED}$, $S_{MD}$, $S_{ENV}$) dependent on mechanical vibrations emanating from rotation of said part;

analysing said first digital signal ($S_{RED}$, $S_{MD}$, $S_{ENV}$) so as to detect peak amplitude values (Ap) during a finite time period ($T_{Pm}$), said finite time period corresponding to a certain amount (R) of revolution of said rotatable part; said certain amount (R) of revolution corresponding to more than one revolution of said monitored rotatable part;

defining a plurality ($N_R$) of amplitude ranges;

sorting said detected peak amplitude values (Ap) into corresponding amplitude ranges so as to reflect occurrence (N) of detected peak amplitude values (Ap) within said plurality of amplitude ranges;

establishing a representative peak amplitude value ($A_{PR}$) in dependence on said sorted peak amplitude values (Ap) and said certain amount (R).

This solution advantageously provides a representative peak amplitude value $A_{PR}$ is indicative of the mechanical state of the monitored part. In particular, when the monitored rotating part includes a bearing assembly, the representative peak amplitude value $A_{PR}$ is indicative of the mechanical State of the bearing Surfaces. In fact, the representative peak amplitude value $A_{PR}$ is indicative of the degree of roughness of the metal Surfaces in the rolling interface. Hence, the representative peak amplitude value ($A_{PR}$) may provide information about the presence of damage to a metal surface in the rolling interface of a bearing assembly. Such damage could include e.g. a crack in a metal Surface in the rolling interface of the monitored bearing assembly. The representative peak amplitude value may also be indicative of spalling at a metal Surface in the rolling interface of the monitored bearing assembly. Spalling may include the flaking-off of material from a surface. The representative peak amplitude value may also be indicative of the presence of a loose particle in the monitored bearing assembly. When there is a damage in the monitored rotating part, this solution, by focusing on a representative peak amplitude value, provides information indicative of the degree of damage of the most serious damage in the monitored rotating part. Hence, the representative peak amplitude value may be indicative of the largest spalling in a monitored rotating part.

According to an embodiment of the invention the certain amount (R) of revolution corresponds to several revolutions of said monitored rotatable part. This solution advantageously provides a measurement procedure which is very reliable in the sense that it provides repeatable results. Hence, when the measurement procedure is repeatedly performed on the same rotational part so that plural monitoring periods $T_{PM1}$, $T_{PM2}$, $T_{PM3}$, $T_{PM4}$, $T_{PM5}$ result in measurement results in the form of plural representative peak amplitude values $A_{PR1}$, $A_{PR2}$, $A_{PR3}$, $A_{PR4}$ being produced in immediate temporal Succession, then these plural representative peak amplitude values $A_{PR1}$, $A_{PR2}$, $A_{PR3}$, $A_{PR4}$ have Substantially the same numerical value.

According to a preferred embodiment of the invention the certain amount R of revolution corresponds to at least eight revolutions of said monitored rotatable part so as to establish a representative peak amplitude value $A_{PR}$, which is indicative of the mechanical state of the monitored part.

The problem of providing an improved method and an Improved apparatus for analysis of the condition of a machine having a rotating part is also addressed by an apparatus for analysing the condition of a machine having a part rotating with a speed of rotation ($f_{ROT}$), comprising:

an input for receiving a first digital signal ($S_{MD}$) dependent on mechanical vibrations emanating from rotation of said part;

a peak detector coupled to said input, said peak detector being adapted to detect peak values ($A_P$) in said received first digital signal ($S_{MD}$), and a burst rejector coupled to receive said detected peak values ($A_P$), said burst rejector being adapted to deliver output peak values ($A_P$) on a burst rejector output in response to received detected peak values ($A_P$); and wherein said burst rejector is adapted to control the delivery of said output peak values ($A_{PO}$) such that said output peak values ($A_P$) are delivered at a delivery frequency $f_{es}$, wherein the delivery frequency $f_{es}=e*f_{ROT}$, wherein $f_{ROT}$ is said speed of rotation, and e is a factor having a predetermined value.

This advantageously leads to a delivery of no more than e output peak values per revolution of the monitored rotating part. Hence, this solution may advantageously reduce or eliminate bursts of amplitude peaks which otherwise may occur. Such bursts of amplitude peaks may cause corruption of an analysis of the condition of a machine having a rotating part based on detection of vibration, shock pulses and/or amplitude peak values. Bursts of amplitude peaks may be caused by impact noise in industrial environments, i.e. bursts of amplitude peaks may be caused e.g. by an Item hitting the body of the machine having a monitored rotating part, thereby causing shock waves which travel back and forth, echoing in the body of the machine. Accordingly, Such echoing shock waves may be picked up by a sensor and reflected in the resulting signal as a burst of amplitude peaks. In an industrial environment such an item may be a vehicle which happens to run into the side of a machine, or a piece of metal falling onto a Surface of a machine. Hence, Such a burst of amplitude peaks may unfortunately cause corruption of a peak level analysis, unless the Impact of such bursts can be reduced or eliminated.

In an embodiment of the apparatus said burst rejector is adapted to deliver each output peak value Such that each delivered output peak amplitude value reflects the highest amplitude value detected in the immediately pre ceding echo suppression period ($T_{es}$), said echo suppression period ($T_{es}$) being the inverse of said delivery frequency $f_{es}$.

In an embodiment of the apparatus the predetermined value of the factor e is ten or less than ten. This advantageously leads to a delivery of no more than ten output peak values per revolution of the monitored rotating part.

According to an embodiment, the apparatus further comprises: means for receiving burst rejector output peak amplitude values that have been collected during a finite time period, said finite time period corresponding to a certain amount of revolution of said rotatable part; said certain amount of revolution corresponding to more than one revolution of said monitored rotatable part;

means for sorting said peak amplitude values into a plurality of amplitude ranges so as to reflect occurrence of detected peak amplitude values within said plurality of amplitude ranges; and means for estimating a representative peak amplitude value in dependence on said sorted peak amplitude values and said certain amount.

BRIEF DESCRIPTION OF THE DRAWINGS

For simple understanding of the present invention, described by means of examples and with reference it will be to the accompanying drawings, of which:

FIG. 8 is a schematic illustration of a rectified signal that could be delivered by the rectifier shown in FIG. 6B.

FIG. 9 illustrates a histogram resulting from a measurement in without any noise.

FIG. 10 illustrates a histogram resulting from another measurement where high amplitude noise was introduced during the measurement.

FIG. 12A is a flow chart illustrating an embodiment of a method of performing a peak level measurement session.

FIG. 12B is a flow chart illustrating an embodiment of a method of performing a peak level measurement session and addressing the impact of bursts of noise amplitude peaks.

DETAILED DESCRIPTION OF THE PREFERRED EMBODIMENT

Figure 1:
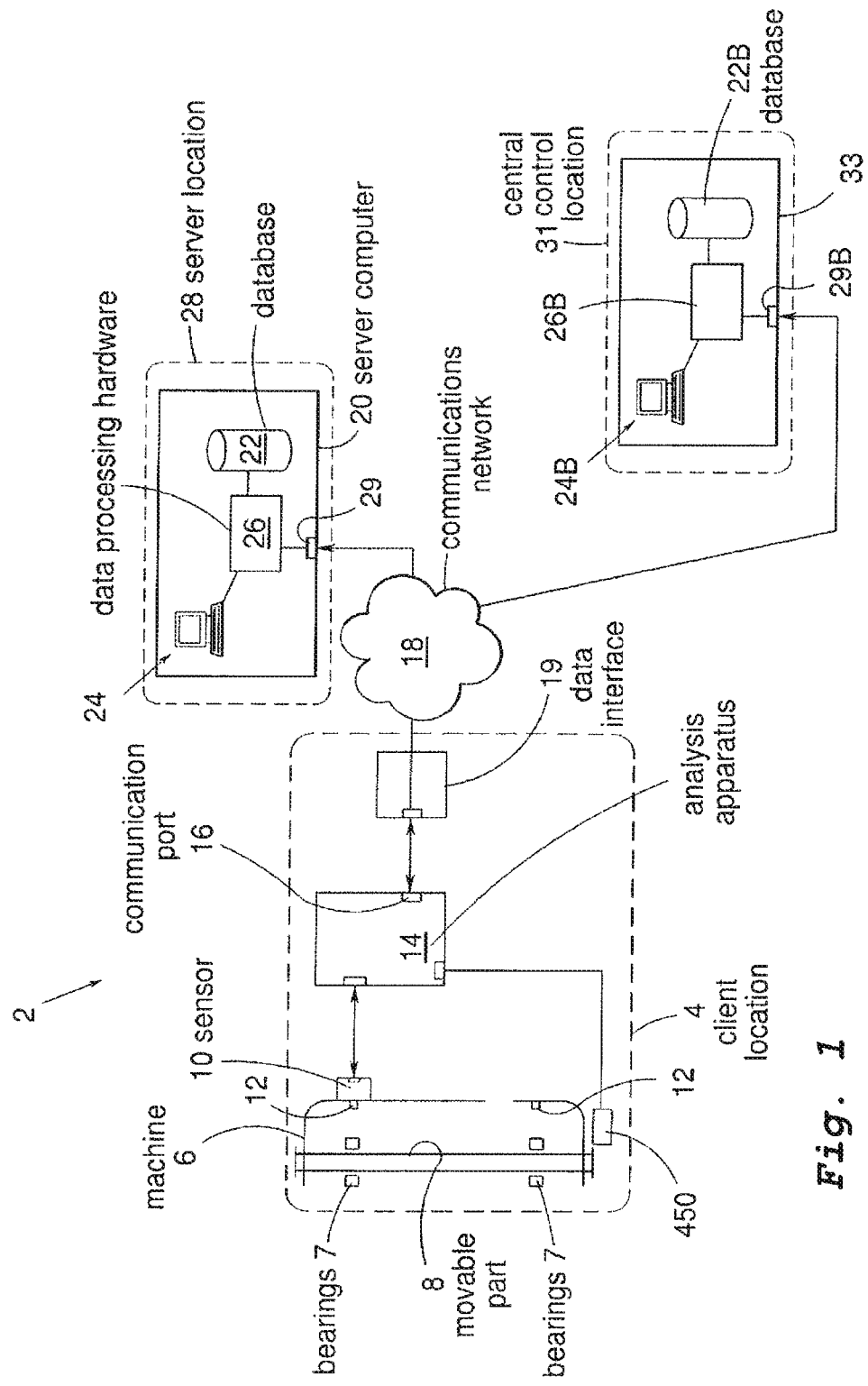
FIG. 1 shows a schematic block diagram of an embodiment of a condition analyzing system 2 according to an embodiment of the invention including an analysis apparatus.

In the following description similar features in different embodiments may be indicated by the same reference numerals.

FIG. 1 shows a schematic block diagram of an embodiment of a condition analyzing system 2 according to an embodiment of the invention. Reference numeral 4 relates to a client location with a machine 6 having a movable part 8. The movable part may comprise bearings 7 and a shaft 8 which, when the machine is in operation, rotates. The operating condition of the shaft 8 or of a bearing 7 can be determined in response to vibrations emanating from the shaft and/or bearing when the shaft rotates. The client location 4, which may also be referred to as client part or user part, may for example be the premises of a wind farm, i.e. a group of wind turbines at a location, or the premises of a paper mill plant, or some other manufacturing plant having machines with movable parts.

An embodiment of the condition analyzing system 2 is operative when a sensor 10 is attached on or at a measuring point 12 on the body of the machine 6. Although FIG. 1 only illustrates two measuring points 12, it to be understood that a location 4 may comprise any number of measuring points 12. The condition analysis system 2 shown in FIG. 1, comprises an analysis apparatus 14 for analysing the condition of a machine on the basis of measurement values delivered by the sensor 10.

The analysis apparatus 14 has a communication port 16 for bi-directional data exchange. The communication port 16 is connectable to a communications network 18, e.g. via a data interface 19. The communications network 18 may be the world wide internet, also known as the Internet. The communications network 18 may also comprise a public switched telephone network.

A server computer 20 is connected to the communications network 18. The server 20 may comprise a database 22, user input/output interfaces 24 and data processing hardware 26, and a communications port 29. The server computer 20 is located on a location 28, which is geographically separate from the client location 4. The server location 28 may be in a first city, such as the Swedish capital Stockholm, and the client location may be in another city, such as Stuttgart, Germany or Detroit in Michigan, USA. Alternatively, the server location 28 may be in a first part of a town and the client location may be in another part of the same town. The server location 28 may also be referred to as supplier part 28, or supplier part location 28.

According to an embodiment of the invention a central control location 31 comprises a control computer 33 having data processing hardware and software for surveying a plurality of machines at the client location 4. The machines 6 may be wind turbines or gear boxes used in wind turbines. Alternatively the machines may include machinery in e.g. a paper mill. The control computer 33 may comprise a database 22B, user input/output interfaces 24B and data processing hardware 26B, and a communications port 29B. The central control location 31 may be separated from the client location 4 by a geographic distance. By means of communications port 29B the control computer 33 can be coupled to communicate with analysis apparatus 14 via port 16. The analysis apparatus 14 may deliver measurement data being partly processed so as to allow further signal processing and/or analysis to be performed at the central location 31 by control computer 33.

A supplier company occupies the supplier part location 28. The supplier company may sell and deliver analysis apparatuses 14 and/or software for use in an analysis apparatus 14. The supplier company may also sell and deliver analysis software for use in the control computer at the central control location 31. Such analysis software 94,105 is discussed in connection with FIG. 4 below. Such analysis software 94,105 may be delivered by transmission over said communications network 18.

According to one embodiment of the system 2 the apparatus 14 is a portable apparatus which may be connected to the communications network 18 from time to time.

According to another embodiment of the system 2 the apparatus 14 is connected to the communications network 18 substantially continuously. Hence, the apparatus 14 according to this embodiment may substantially always be "on line" available for communication with the supplier computer 20 and/or with the control computer 33 at control location 31.

Figure 2A:
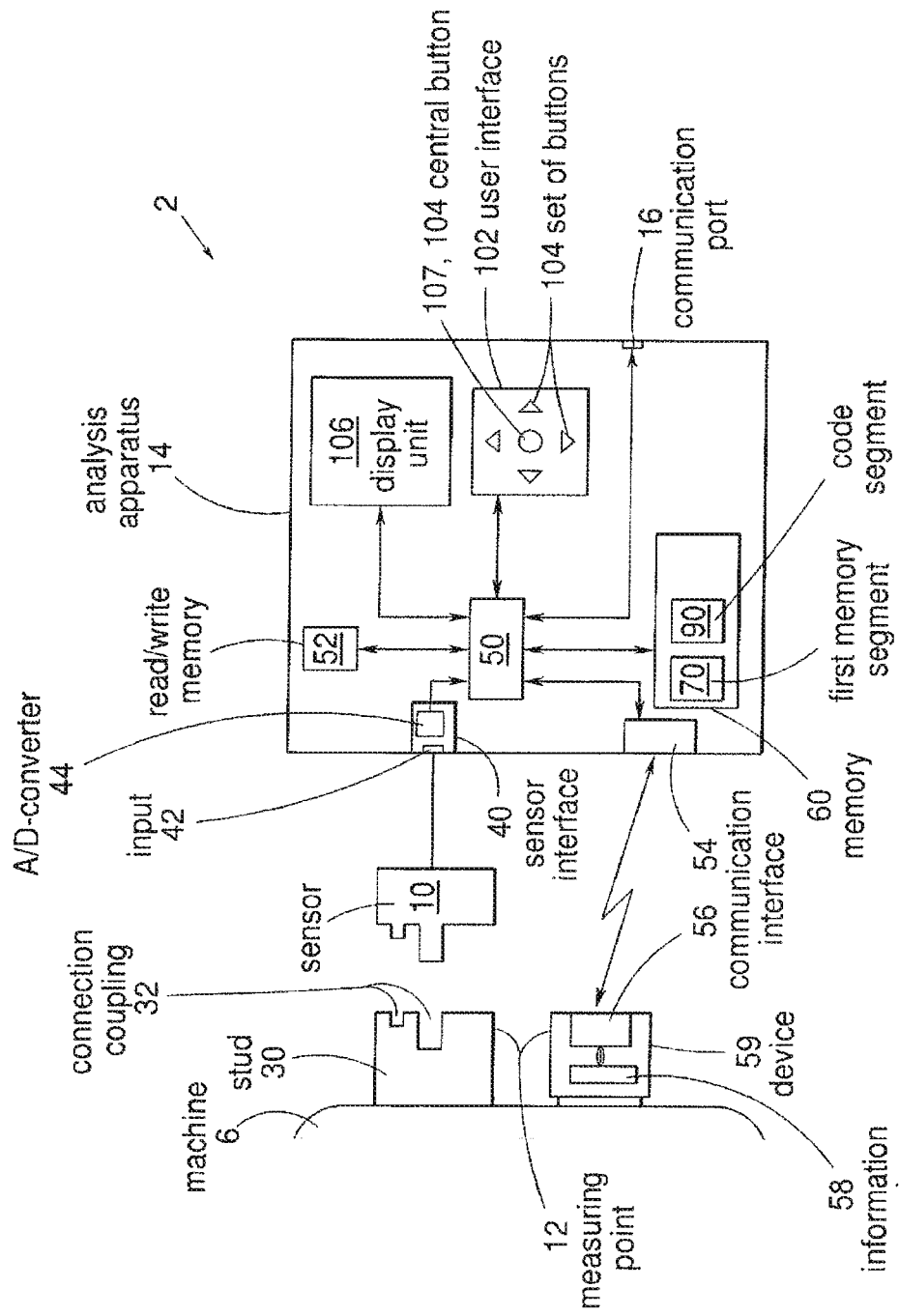
FIG. 2A is a schematic block diagram of an embodiment of a part of the condition analyzing system 2 shown in FIG. 1 including an embodiment of an analysis apparatus.

FIG. 2A is a schematic block diagram of an embodiment of a part of the condition analyzing system 2 shown in FIG. 1. The condition analyzing system, as illustrated in FIG. 2A, comprises a sensor unit 10 for producing a measured value. The measured value may be dependent on movement or, more precisely, dependent on vibrations or shock pulses caused by bearings when the shaft rotates.

An embodiment of the condition analyzing system 2 is operative when a device 30 is firmly mounted on or at a measuring point on a machine 6. The device 30 mounted at the measuring point may be referred to as a stud 30. A stud 30 can comprise a connection coupling 32 to which the sensor unit 10 is removably attachable. The connection coupling 32 can, for example comprise double start threads for enabling the sensor unit to be mechanically engaged with the stud by means of a ¼ turn rotation.

A measuring point 12 can comprise a threaded recess in the casing of the machine. A stud 30 may have a protruding part with threads corresponding to those of the recess for enabling the stud to be firmly attached to the measuring point by introduction into the recess like a bolt.

Alternatively, a measuring point can comprise a threaded recess in the casing of the machine, and the sensor unit 10 may comprise corresponding threads so that it can be directly introduced into the recess. Alternatively, the measuring point is marked on the casing of the machine only with a painted mark.

The machine 6 exemplified in FIG. 2A may have a rotating shaft with a certain shaft diameter d1. The shaft in the machine 24 may rotate with a speed of rotation V1 when the machine 6 is in use.

The sensor unit 10 may be coupled to the apparatus 14 for analysing the condition of a machine. With reference to FIG. 2A, the analysis apparatus 14 comprises a sensor interface 40 for receiving a measured signal or measurement data, produced by the sensor 10. The sensor interface 40 is coupled to a data processing means 50 capable of controlling the operation of the analysis apparatus 14 in accordance with program code. The data processing means 50 is also coupled to a memory 60 for storing said program code.

According to an embodiment of the Invention the sensor interface 40 comprises an input 42 for receiving an analogue signal, the input 42 being connected to an analogue-to-digital (A/D) converter 44, the digital output 48 of which is coupled to the data processing means 50. The A/D converter 44 samples the received analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

Figure 2B:
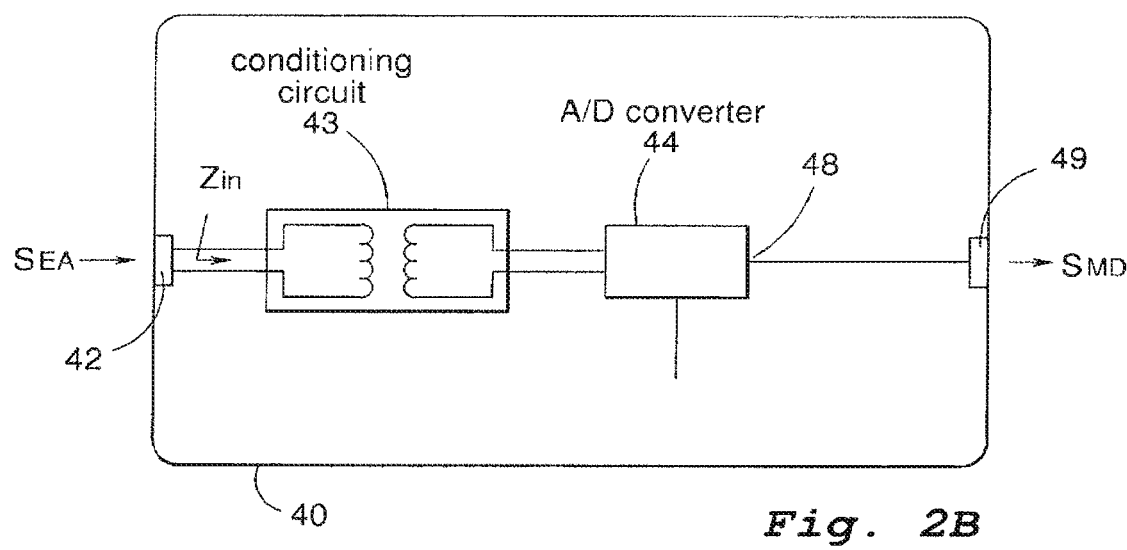
FIG. 2B is a schematic block diagram of an embodiment of a sensor interface.

According to another embodiment of the invention, illustrated in FIG. 2B, the sensor interface 40 comprises an input 42 for receiving an analogue signal $S_{EA}$ from a Shock Pulse Measurement Sensor, a conditioning circuit 43 coupled to receive the analogue signal, and an A/D converter 44 coupled to receive the conditioned analogue signal from the conditioning circuit 43. The A/D converter 44 samples the received conditioned analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

The sampling theorem guarantees that bandlimited signals (i.e., signals which have a maximum frequency) can be reconstructed perfectly from their sampled version, if the sampling rate $f_S$ is more than twice the maximum frequency $f_{SEAmax}$ of the analogue signal $S_{EA}$ to be monitored. The frequency equal to one-half of the sampling rate is therefore a theoretical limit on the highest frequency that can be unambiguously represented by the sampled signal $S_{MD}$. This frequency (half the sampling rate) is called the Nyquist frequency of the sampling system. Frequencies above the Nyquist frequency $f_N$ can be observed in the sampled signal, but their frequency is ambiguous. That is, a frequency component with frequency f cannot be distinguished from other components with frequencies $B*f_N+f$, and $$B*f_N-f$$

for nonzero integers B. This ambiguity, known as aliasing may be handled by filtering the signal with an anti-aliasing filter (usually a low-pass filter with cutoff near the Nyquist frequency) before conversion to the sampled discrete representation.

In order to provide a safety margin for in terms of allowing a non-ideal filter to have a certain slope in the frequency response, the sampling frequency may be selected to a higher value than 2. Hence, according to embodiments of the invention the sampling frequency may be set to $$f_S = k*f_{SEAmax}$$

wherein k is a factor having a value higher than 2.0

Accordingly the factor k may be selected to a value higher than 2.0. Preferably factor k may be selected to a value between 2.0 and 2.9 in order to provide a good safety margin while avoiding to generate unnecessarily many sample values. According to an embodiment the factor k is advantageously selected such that $100*k/2$ renders an integer. According to an embodiment the factor k may be set to 2.56. Selecting k to 2.56 renders $100*k=256=2$ raised to 8.

According to an embodiment the sampling frequency $f_S$ of the digital measurement data signal $S_{MD}$ may be fixed to a certain value $f_S$, such as e.g. $f_S=102$ kHz Hence, when the sampling frequency $f_S$ is fixed to a certain value $f_S$, the maximum frequency $f_{SEAmax}$ of the analogue signal $S_{EA}$ will be:

$$f_{SEAmax} = f_S/k$$

wherein $f_{SEAmax}$ is the highest frequency to be analyzed in the sampled signal Hence, when the sampling frequency $f_S$ is fixed to a certain value $f_S=102\ 400$ Hz, and the factor k is set to 2.56, the maximum frequency $f_{SEAmax}$ of the analogue signal $S_{EA}$ will be:

$$f_{SEAmax} = f_S/k = 102400/2{,}56 = 40 \text{ kHz}$$

Accordingly, a digital measurement data signal $S_{MD}$, having a certain sampling frequency $f_S$, is generated in response to said received analogue measurement signal $S_{EA}$. The digital output 48 of the A/D converter 44 is coupled to the data processing means 50 via an output 49 of the sensor interface 40 so as to deliver the digital measurement data signal $S_{MD}$ to the data processing means 50.

The sensor unit 10 may comprise a vibration transducer, the sensor unit being structured to physically engage the connection coupling of the measuring point so that vibrations of the machine at the measuring point are transferred to the vibration transducer. According to an embodiment of the invention the sensor unit comprises a transducer having a piezo-electric element. When the measuring point 12 vibrates, the sensor unit 10, or at least a part of it, also vibrates and the transducer then produces an electrical signal of which the frequency and amplitude depend on the mechanical vibration frequency and the vibration amplitude of the measuring point 12, respectively. According to an embodiment of the invention the sensor unit 10 is a vibration sensor, providing an analogue amplitude signal of e.g. 10 mV/g in the Frequency Range 1.00 to 10000 Hz. Such a vibration sensor is designed to deliver substantially the same amplitude of 10 mV irrespective of whether it is exerted to the acceleration of 1 g (9.82 m/s$^2$) at 1 Hz, 3 Hz or 10 Hz. Hence, a typical vibration sensor has a linear response in a specified frequency range up to around 10 kHz. Mechanical vibrations in that frequency range emanating from rotating machine parts are usually caused by imbalance or misalignment. However, when mounted on a machine the linear response vibration sensor typically also has several different mechanical resonance frequencies dependent on the physical path between sensor and vibration source.

A damage in a roller bearing may cause relatively sharp elastic waves, known as shock pulses, travelling along a physical path in the housing of a machine before reaching the sensor. Such shock pulses often have a broad frequency spectrum. The amplitude of a roller bearing shock pulse is typically lower than the amplitude of a vibration caused by imbalance or misalignment.

The broad frequency spectrum of shock pulse signatures enables them to activate a "ringing response" or a resonance at a resonance frequency associated with the sensor.

Figure 2C:
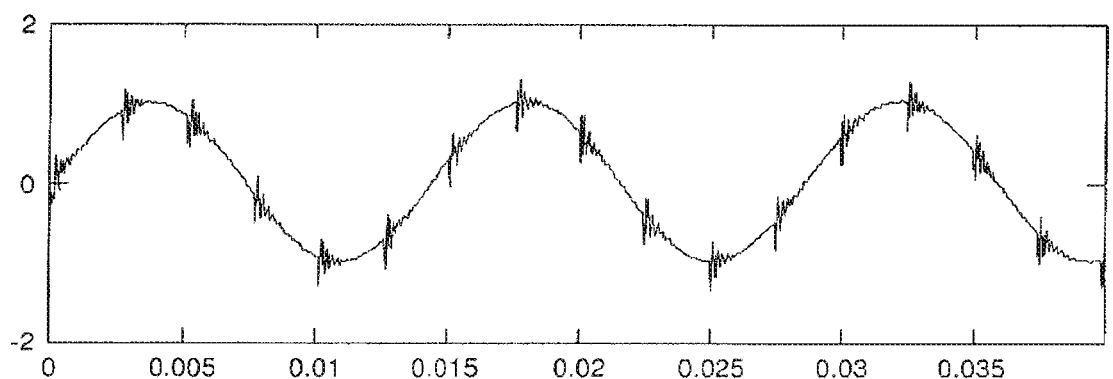
FIG. 2C is an illustration of a measuring signal from a vibration sensor.

Hence, a typical measuring signal from a vibration sensor may have a wave form as shown in FIG. 2C, i.e. a dominant low frequency signal with a superimposed higher frequency lower amplitude resonant "ringing response".

In order to enable analysis of the shock pulse signature, often emanating from a bearing damage, the low frequency component must be filtered out. This can be achieved by means of a high pass filter or by means of a band pass filter. However, these filters must be adjusted such that the low frequency signal portion is blocked while the high frequency signal portion is passed on. An individual vibration sensor will typically have one resonance frequency associated with the physical path from one shock pulse signal source, and a different resonance frequency associated with the physical path from another shock pulse signal source, as mentioned in U.S. Pat. No. 6,053,047. Hence, filter adjustment aiming to pass the high frequency signal portion requires individual adaptation when a vibration sensor is used.

When such filter is correctly adjusted the resulting signal will consist of the shock pulse signature(s). However, the analysis of the shock pulse signature(s) emanating from a vibration sensor is somewhat impaired by the fact that the amplitude response as well as resonance frequency inherently varies dependent on the individual physical path from the shock pulse signal sources.

Advantageously, these drawbacks associated with vibration sensors may be alleviated by the use of a Shock Pulse Measurement sensor. The Shock Pulse Measurement sensor is designed and adapted to provide a predetermined mechanical resonance frequency, as described in further detail below.

This feature of the Shock Pulse Measurement sensor advantageously renders repeatable measurement results in that the output signal from a Shock Pulse Measurement sensor has a stable resonance frequency substantially independent of the physical path between the shock pulse signal source and the shock pulse sensor. Moreover, mutually different individual shock pulse sensors provide a very small, if any, deviation in resonance frequency.

An advantageous effect of this is that signal processing is simplified, in that filters need not be individually adjusted, in contrast to the case described above when vibration sensors are used. Moreover, the amplitude response from shock pulse sensors is well defined such that an individual measurement provides reliable information when measurement is performed in accordance with appropriate measurement methods defined by S.P.M. Instrument AB.

Figure 2D:
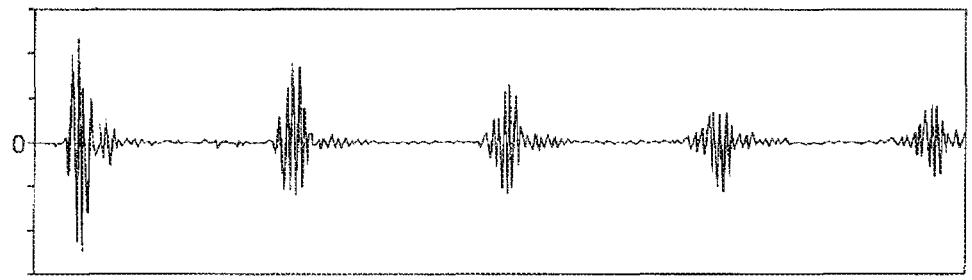
FIG. 2D illustrates a measuring signal amplitude generated by a shock pulse sensor.
Figure 2E:
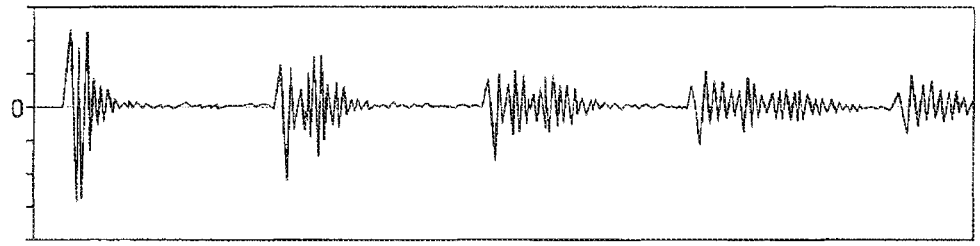
FIG. 2E illustrates a measuring signal amplitude generated by a vibration sensor.

FIG. 2D illustrates a measuring signal amplitude generated by a shock pulse sensor, and FIG. 2E illustrates a measuring signal amplitude generated by a vibration sensor. Both sensors have been exerted to the same series of mechanical shocks without the typical low frequency signal content. As clearly seen in FIGS. 2D and 2E, the duration of a resonance response to a shock pulse signature from the Shock Pulse Measurement sensor is shorter than the corresponding resonance response to a shock pulse signature from the vibration sensor.

This feature of the Shock Pulse Measurement sensor of providing distinct shock pulse signature responses has the advantageous effect of providing a measurement signal from which it is possible to distinguish between different mechanical shock pulses that occur within a short time span.

Figure 3:
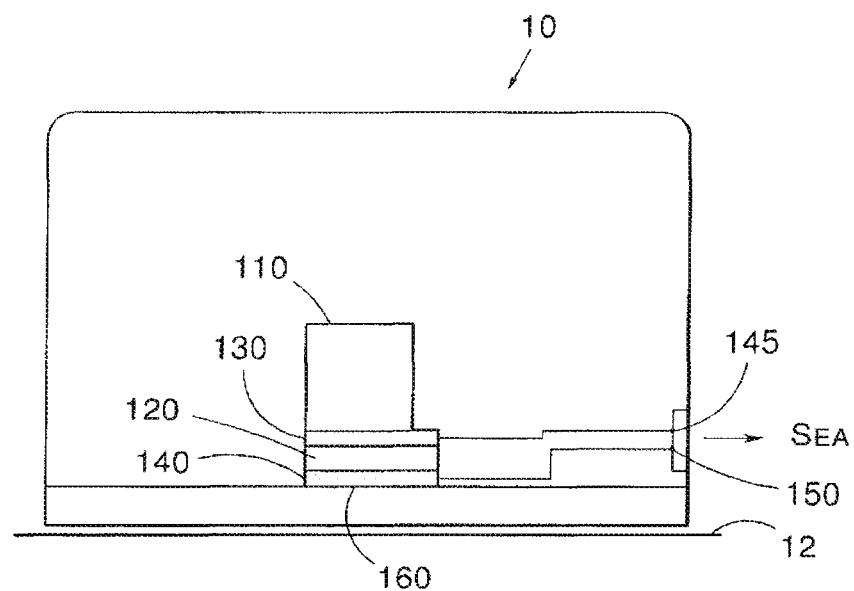
FIG. 3 is a simplified illustration of a Shock Pulse Measurement sensor according to an embodiment of the invention.

According to an embodiment of the invention the sensor is a Shock Pulse Measurement sensor. FIG. 3 is a simplified illustration of a Shock Pulse Measurement sensor 10 according to an embodiment of the invention. According to this embodiment the sensor comprises a part 110 having a certain mass or weight and a piezo-electrical element 120. The piezo-electrical element 120 is somewhat flexible so that it can contract and expand when exerted to external force. The piezo-electrical element 120 is provided with electrically conducting layers 130 and 140, respectively, on opposing surfaces. As the piezo-electrical element 120 contracts and expands it generates an electric signal which is picked up by the conducting layers 130 and 140. Accordingly, a mechanical vibration is transformed into an analogue electrical measurement signal $S_{EA}$, which is delivered on output terminals 145, 150.

The piezo-electrical element 120 may be positioned between the weight 110 and a surface 160 which, during operation, is physically attached to the measuring point 12, as illustrated in FIG. 3.

The Shock Pulse Measurement sensor 10 has a resonance frequency that depends on the mechanical characteristics for the sensor, such as the mass m of weight part 110 and the resilience of piezo-electrical element 120. Hence, the piezo-electrical element has an elasticity and a spring constant k. The mechanical resonance frequency $f_{RM}$ for the sensor is therefore also dependent on the mass m and the spring constant k.

According to an embodiment of the Invention the mechanical resonance frequency $f_{RM}$ for the sensor can be determined by the equation following equation:

$$f_{RM}=1(2T)\sqrt{(k/m)} \qquad (eq1)$$

According to another embodiment the actual mechanical resonance frequency for a Shock Pulse Measurement sensor 10 may also depend on other factors, such as the nature of the attachment of the sensor 10 to the body of the machine 6.

The resonant Shock Pulse Measurement sensor 10 is thereby particularly sensitive to vibrations having a frequency on or near the mechanical resonance frequency $f_{RM}$ The Shock Pulse Measurement sensor 10 may be designed so that the mechanical resonance frequency $f_{RM}$ is somewhere in the range from 28 kHz to 37 kHz. According to another embodiment the mechanical resonance frequency $f_{RM}$ is somewhere in the range from 30 kHz to 35 kHz.

Accordingly the analogue electrical measurement signal has an electrical amplitude which may vary over the frequency spectrum. For the purpose of describing the theoretical background, it may be assumed that if the Shock Pulse Measurement sensor 10 were exerted to mechanical vibrations with identical amplitude in all frequencies from e.g. 1 Hz to e.g. 200 000 kHz, then the amplitude of the analogue signal $S_{EA}$ from the Shock Pulse Measurement Sensor will have a maximum at the mechanical resonance frequency $f_{RM}$, since the sensor will resonate when being "pushed" with that frequency.

With reference to FIG. 2B, the conditioning circuit 43 receives the analogue signal $S_{EA}$. The conditioning circuit 43 may be designed to be an impedance adaption circuit designed to adapt the input impedance of the A/D-converter as seen from the sensor terminals 145,150 so that an optimum signal transfer will occur. Hence, the conditioning circuit 43 may operate to adapt the input impedance $Z_{in}$ as seen from the sensor terminals 145,150 so that a maximum electric power is delivered to the A/D-converter 44. According to an embodiment of the conditioning circuit 43 the analogue signal $S_{EA}$ is fed to the primary winding of a transformer, and a conditioned analogue signal is delivered by a secondary winding of the transformer. The primary winding has n1 turns and the secondary winding has n2 turns, the ratio $n1/n2=n_{12}$. Hence, the A/D converter 44 is coupled to receive the conditioned analogue signal from the conditioning circuit 43. The A/D converter 44 has an input impedance $Z_{44}$, and the input impedance of the A/D-converter as seen from the sensor terminals 145,150 will be $(n1/n2)^2 * Z_{44}$, when the conditioning circuit 43 is coupled in between the sensor terminals 145,150 and the input terminals of the A/D converter 44.

The A/D converter 44 samples the received conditioned analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

Figure 5:
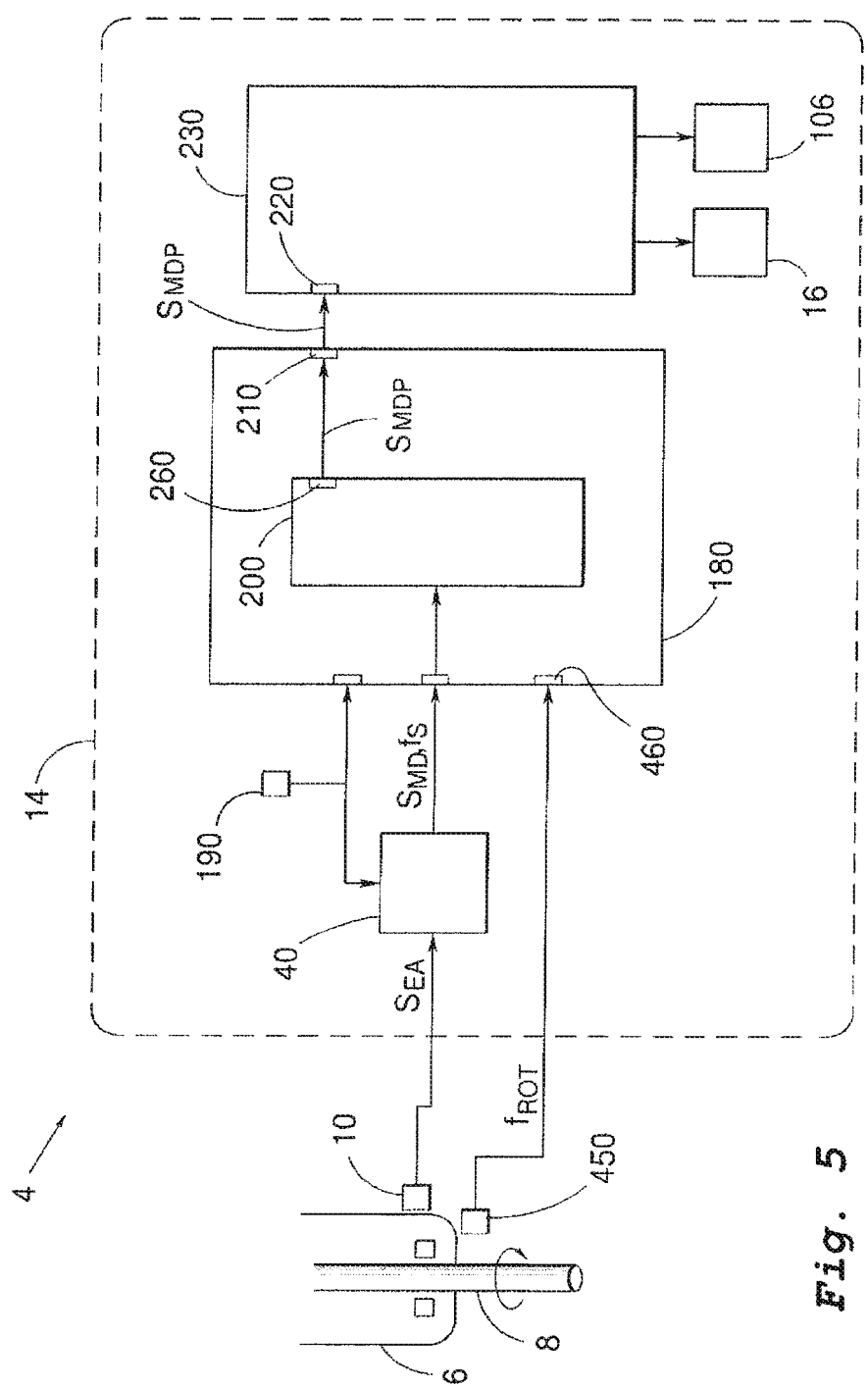
FIG. 5 is a schematic block diagram of an embodiment of the analysis apparatus at a client location with a machine 6 having a movable shaft.

According to embodiments of the invention the digital measurement data signal $S_{MD}$ is delivered to a means 180 for digital signal processing (See FIG. 5).

According to an embodiment of the invention the means 180 for digital signal processing comprises the data processor 50 and program code for causing the data processor 50 to perform digital signal processing. According to an embodiment of the invention the processor 50 is embodied by a Digital Signal Processor. The Digital Signal Processor may also be referred to as a DSP.

Figure 4:
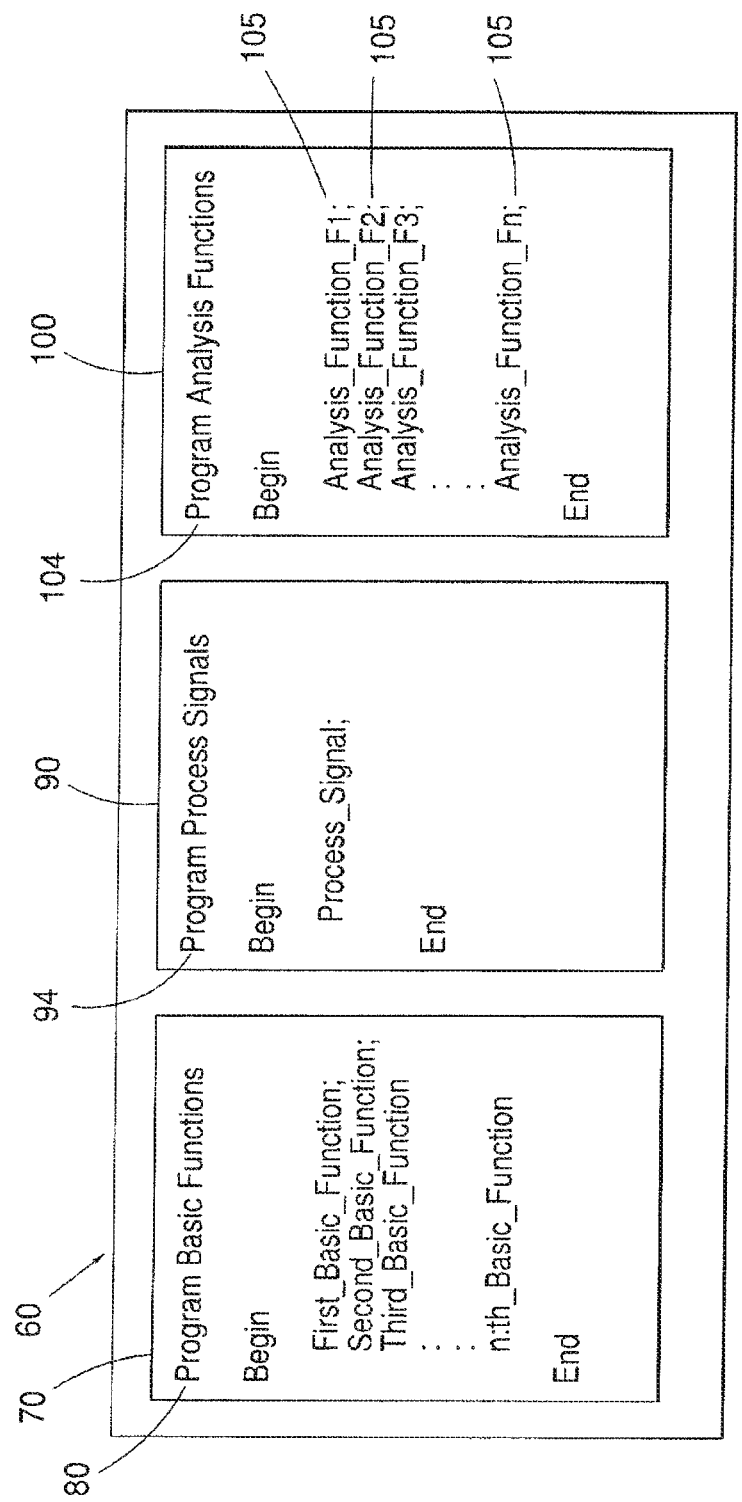
FIG. 4 is a simplified illustration of an embodiment of the memory 60 and its contents.

With reference to FIG. 2A, the data processing means 50 is coupled to a memory 60 for storing said program code. The program memory 60 is preferably a non-volatile memory. The memory 60 may be a read/write memory, i.e. enabling both reading data from the memory and writing new data onto the memory 60. According to an embodiment the program memory 60 is embodied by a FLASH memory. The program memory 60 may comprise a first memory segment 70 for storing a first set of program code 80 which is executable so as to control the analysis apparatus 14 to perform basic operations (FIG. 2A and FIG. 4). The program memory may also comprise a second memory segment 90 for storing a second set of program code 94. The second set of program code 94 in the second memory segment 90 may include program code for causing the analysis apparatus to process the detected signal, or signals, so as to generate a pre-processed signal or a set of pre-processed signals. The memory 60 may also include a third memory segment 100 for storing a third set of program code 104. The set of program code 104 in the third memory segment 100 may include program code for causing the analysis apparatus to perform a selected analysis function 105. When an analysis function is executed it may cause the analysis apparatus to present a corresponding analysis result on user interface 106 or to deliver the analysis result on port 16 (See FIG. 1 and FIG. 2A and FIG. 7).

The data processing means 50 is also coupled to a read/write memory 52 for data storage. Moreover, the data processing means 50 may be coupled to an analysis apparatus communications interface 54. The analysis apparatus communications interface 54 provides for bi-directional communication with a measuring point communication interface 56 which is attachable on, at or in the vicinity of the measuring point on the machine.

The measuring point 12 may comprise a connection coupling 32, a readable and writeable information carrier 58, and a measuring point communication interface 56.

The writeable information carrier 58, and the measuring point communication interface 56 may be provided in a separate device 59 placed in the vicinity of the stud 30, as illustrated in FIG. 2. Alternatively the writeable information carrier 58, and the measuring point communication interface 56 may be provided within the stud 30. This is described in more detail in WO 98/01831, the content of which is hereby incorporated by reference.

The system 2 is arranged to allow bidirectional communication between the measuring point communication interface 56 and the analysis apparatus communication interface 54. The measuring point communication interface 56 and the analysis apparatus communication interface 54 are preferably constructed to allow wireless communication. According to an embodiment the measuring point communication interface and the analysis apparatus communication interface are constructed to communicate with one another by radio frequency (RF) signals. This embodiment includes an antenna in the measuring point communication interface 56 and another antenna the analysis apparatus communication interface 54.

FIG. 4 is a simplified illustration of an embodiment of the memory 60 and its contents. The simplified illustration is intended to convey understanding of the general idea of storing different program functions in memory 60, and it is not necessarily a correct technical teaching of the way in which a program would be stored in a real memory circuit. The first memory segment 70 stores program code for controlling the analysis apparatus 14 to perform basic operations. Although the simplified illustration of FIG. 4 shows pseudo code, it is to be understood that the program code 80 may be constituted by machine code, or any level program code that can be executed or interpreted by the data processing means 50 (FIG. 2A).

The second memory segment 90, illustrated in FIG. 4, stores a second set of program code 94. The program code 94 in segment 90, when run on the data processing means 50, will cause the analysis apparatus 14 to perform a function, such as a digital signal processing function. The function may comprise an advanced mathematical processing of the digital measurement data signal $S_{MD}$. According to embodiments of the invention the program code 94 is adapted to cause the processor means 50 to perform signal processing functions described in connection with FIGS. 5, 6, 9, 10, 11A, 11B, 12A, 12B, 13A-C, 14A, 14B, 15A and/or FIG. 16 in this document.

As mentioned above in connection with FIG. 1, a computer program for controlling the function of the analysis apparatus may be downloaded from the server computer 20. This means that the program-to-be-downloaded is transmitted to over the communications network 18. This can be done by modulating a carrier wave to carry the program over the communications network 18. Accordingly the downloaded program may be loaded into a digital memory, such as memory 60 (See FIGS. 2A and 4). Hence, a signal processing program 94 and or an analysis function program 104, 105 may be received via a communications port, such as port 16 (FIGS. 1 & 2A), so as to load it into memory 60. Similarly, a signal processing program 94 and or an analysis function program 104, 105 may be received via communications port 29B (FIG. 1), so as to load it into a program memory location in computer 26B or in database 22B.

An aspect of the invention relates to a computer program product, such as a program code means 94 and/or program code means 104, 105 loadable into a digital memory of an apparatus. The computer program product comprising software code portions for performing signal processing methods and/or analysis functions when said product is run on a data processing unit 50 of an apparatus for analysing the condition of a machine. The term "run on a data processing unit" means that the computer program plus the data processing unit carries out a method of the kind described in this document.

The wording "a computer program product, load-able into a digital memory of a condition analysing apparatus" means that a computer program can be introduced into a digital memory of a condition analysing apparatus so as achieve a condition analysing apparatus programmed to be capable of, or adapted to, carrying out a method of the kind described above. The term "loaded into a digital memory of a condition analysing apparatus" means that the condition analysing apparatus programmed in this way is capable of, or adapted to, carrying out a method of the kind described above.

The above mentioned computer program product may also be loadable onto a computer readable medium, such as a compact disc or DVD. Such a computer readable medium may be used for delivery of the program to a client.

According to an embodiment of the analysis apparatus 14 (FIG. 2A), it comprises a user input interface 102, whereby an operator may interact with the analysis apparatus 14. According to an embodiment the user input interface 102 comprises a set of buttons 104. An embodiment of the analysis apparatus 14 comprises a user output interface 106. The user output interface may comprise a display unit 106. The data processing means 50, when it runs a basic program function provided in the basic program code 80, provides for user interaction by means of the user input interface 102 and the display unit 106. The set of buttons 104 may be limited to a few buttons, such as for example five buttons, as illustrated in FIG. 2A. A central button 107 may be used for an ENTER or SELECT function, whereas other, more peripheral buttons may be used for moving a cursor on the display 106. In this manner it is to be understood that symbols and text may be entered into the apparatus 14 via the user interface. The display unit 106 may, for example, display a number of symbols, such as the letters of alphabet, while the cursor is movable on the display in response to user input so as to allow the user to input information.

FIG. 5 is a schematic block diagram of an embodiment of the analysis apparatus 14 at a client location 4 with a machine 6 having a movable shaft 8. The sensor 10, which may be a Shock Pulse Measurement Sensor, is shown attached to the body of the machine 6 so as to pick up mechanical vibrations and so as to deliver an analogue measurement signal $S_{EA}$ indicative of the detected mechanical vibrations to the sensor interface 40. The sensor interface 40 may be designed as described in connection with FIG. 2A or 2B. The sensor interface 40 delivers a digital measurement data signal $S_{MD}$ to a means 180 for digital signal processing.

The digital measurement data signal $S_{MD}$ has a sampling frequency $f_S$, and the amplitude value of each sample depends on the amplitude of the received analogue measurement signal $S_{EA}$ at the moment of sampling. According to an embodiment the sampling frequency $f_S$ of the digital measurement data signal $S_{MD}$ may be fixed to a certain value $f_S$, such as e.g. $f_S$=102 400 Hz. The sampling frequency $f_S$ may be controlled by a clock signal delivered by a clock 190, as illustrated in FIG. 5. The clock signal may also be delivered to the means 180 for digital signal processing. The means 180 for digital signal processing can produce information about the temporal duration of the received digital measurement data signal $S_{MD}$ in response to the received digital measurement data signal $S_{MD}$, the clock signal and the relation between the sampling frequency $f_S$ and the clock signal, since the duration between two consecutive sample values equals Ts=1/$f_S$.

According to embodiments of the invention the means 180 for digital signal processing includes a pre-processor 200 for performing a pre-processing of the digital measurement data signal $S_{MD}$ so as to deliver a pre-processed digital signal $S_{MDP}$ on an output 210. The output 210 is coupled to an input 220 of an evaluator 230. The evaluator 230 is adapted to evaluate the pre-processed digital signal $S_{MDP}$ so as to deliver a result of the evaluation to a user interface 106. Alternatively the result of the evaluation may be delivered to a communication port 16 so as to enable the transmission of the result e.g. to a control computer 33 at a control site 31 (See FIG. 1).

According to an embodiment of the invention, the functions described in connection with the functional blocks in means 180 for digital signal processing, pre-processor 200 and evaluator 230 may be embodied by computer program code 94 and/or 104 as described in connection with memory blocks 90 and 100 in connection with FIG. 4 above.

A user may require only a few basic monitoring functions for detection of whether the condition of a machine is normal or abnormal. On detecting an abnormal condition, the user may call for specialized professional maintenance personnel to establish the exact nature of the problem, and for performing the necessary maintenance work. The professional maintenance personnel frequently needs and uses a broad range of evaluation functions making it possible to establish the nature of, and/or cause for, an abnormal machine condition. Hence, different users of an analysis apparatus 14 may pose very different demands on the function of the apparatus. The term Condition Monitoring function is used in this document for a function for detection of whether the condition of a machine is normal or somewhat deteriorated or abnormal. The term Condition Monitoring function also comprises an evaluation function making it possible to establish the nature of, and/or cause for, an abnormal machine condition.

Examples of Machine Condition Monitoring Functions

The condition monitoring functions F1, F2 . . . Fn includes functions such as: vibration analysis, shock pulse measuring, Peak level analysis, spectrum analysis of shock pulse measurement data, Fast Fourier Transformation of vibration measurement data, graphical presentation of condition data on a user interface, storage of condition data in a writeable information carrier on said machine, storage of condition data in a writeable information carrier in said apparatus, tachometering, imbalance detection, and mis-aligmnent detection.

According to an embodiment the apparatus 14 includes the following functions:
F1=vibration analysis;
F2=shock pulse measuring,
F3=Peak level analysis
F4=spectrum analysis of shock pulse measurement data,
F5=Fast Fourier Transformation of vibration measurement data,
F6=graphical presentation of condition data on a user interface,
F7=storage of condition data m a writeable information carrier on said machine,
F8=storage of condition data m a writeable information carrier 52 in said apparatus,
F9=tachometering,
F10=Imbalance detection, and
F11=misalignment detection.
F12=Retrieval of condition data from a writeable information carrier 58 on said machine.
F13=Performing Peak level analysis F3 and performing function F12 "Retrieval of condition data from a writeable information carrier 58 on said machine" so as to enable a comparison or trending based on current Peak level data and historical Peak level data.
F14=Retrieval of identification data from a writeable information carrier 58 on said machine.

Embodiments of the function F7 "storage of condition data in a writeable information carrier on said machine", and F13 vibration analysis and retrieval of condition data is described in more detail in WO 98/01831, the content of which is hereby incorporated by reference.

The peak level analysis F3 may be performed on the basis of the enveloped time domain signal $S_{ENV}$ delivered by the enveloper 250. The signal $S_{ENV}$ is also referred to as $S_{MDP}$. The peak level analysis F3 is adapted to monitor the signal for the duration of a peak monitoring period $P_{PM}$ for the purpose of establishing the maximum amplitude level.

The peak amplitude may be indicative of Oil film thickness in a monitored bearing. Hence, the detected peak amplitude may be indicative of separation between the metal surfaces in the rolling interface. The oil film thickness may depend on lubricant supply and/or on alignment of the shaft. Moreover, the oil film thickness may depend on the load on the shaft, i.e. on the force with which metal surfaces are pressed together, the metal surfaces being e.g. that of a bearing and that of a shaft.

The actual detected value of the maximum amplitude level may also depend on the mechanical state of the bearing surfaces, i.e., the condition of the bearing assembly. Accordingly, the detected value of the maximum amplitude level may depend on roughness of the metal surfaces in the rolling interface, and/or damage to a metal surface in the rolling interface. The detected value of the maximum amplitude level may also depend on the occurrence of a loose particle in the bearing assembly.

Figure 6A:
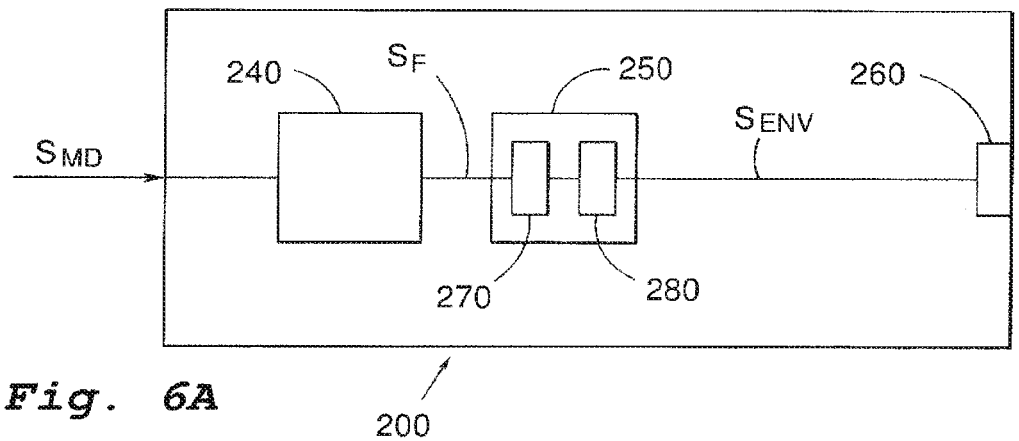
FIG. 6A illustrates a schematic block diagram of an embodiment of the pre-processor according to an embodiment of the present invention.

FIG. 6A illustrates a schematic block diagram of an embodiment of the pre-processor 200 according to an embodiment of the present invention. In this embodiment the digital measurement data signal $S_{MD}$ is coupled to a digital band pass filter 240 having a lower cutoff frequency fir an upper cutoff frequency $f_{UC}$ and passband bandwidth between the upper and lower cutoff frequencies.

The output from the digital band pass filter 240 is connected to a digital enveloper 250. According to an embodiment of the invention the signal output from the enveloper 250 is delivered to an output 260. The output 260 of the pre-processor 200 is coupled to output 210 of digital signal processing means 180 for delivery to the input 220 of evaluator 230.

The upper and lower cutoff frequencies of the digital band pass filter 240 may selected so that the frequency components of the signal $S_{MD}$ at the resonance frequency $f_{RM}$ for the sensor are in the passband bandwidth. As mentioned above, an amplification of the mechanical vibration is achieved by the sensor being mechanically resonant at the resonance frequency $f_{RM}$. Accordingly the analogue measurement signal $S_{EA}$ reflects an amplified value of the vibrations at and around the resonance frequency $f_{RM}$. Hence, the band pass filter according to the FIG. 6 embodiment advantageously suppresses the signal at frequencies below and above resonance frequency $f_{RM}$, so as to further enhance the components of the measurement signal at the resonance frequency $f_{RM}$. Moreover, the digital band pass filter 240 advantageously further reduces noise inherently included in the measurement signal, since any noise components below the lower cutoff frequency $f_{LC}$ and above upper cutoff frequency $f_{UC}$ are also eliminated or reduced. Hence, when using a resonant Shock Pulse Measurement sensor 10 having a mechanical resonance frequency $f_{RM}$ in a range from a lowest resonance frequency value $f_{RML}$ to a highest resonance frequency value $f_{RMU}$ the digital band pass filter 240 may be designed to having a lower cutoff frequency $f_{LC}=f_{RM}$, and an upper cutoff frequency $f_{UC}=f_{RMU}$. According to an embodiment the lower cutoff frequency $f_{LC}=f_{RML}=28$ kHz, and the upper cutoff frequency $f_{UC}=f_{RMU}=37$ kHz.

According to another embodiment the mechanical resonance frequency $f_{RM}$ is somewhere in the range from 30 kHz to 35 kHz, and the digital band pass filter 240 may then be designed to having a lower cutoff frequency $f_{LC}=30$ kHz and an upper cutoff frequency $f_{UC}=35$ kHz.

According to another embodiment the digital band pass filter 240 may be designed to have a lower cutoff frequency $F_{LC}$ being lower than the lowest resonance frequency value $f_{RM}$, and an upper cutoff frequency $f_{UC}$ being higher than the highest resonance frequency value $f_{RMU}$. For example the mechanical resonance frequency $f_{RM}$ may be a frequency in the range from 30 kHz to 35 kHz, and the digital band pass filter 240 may then be designed to having a lower cutoff frequency $f_{LC}=17$ kHz, and an upper cutoff frequency $f_{UC}=36$ kHz.

Accordingly, the digital band pass filter 240 may deliver a passband digital measurement data signal $S_F$ having an advantageously low out-of-band noise content and reflecting mechanical vibrations in the passband. The passband digital measurement data signal $S_F$ may be delivered to an enveloper 250.

The digital enveloper 250 accordingly receives the passband digital measurement data signal $S_F$ which may reflect a signal having positive as well as negative amplitudes. With reference to FIG. 6A, the received signal is rectified by a digital rectifier 270, and the rectified signal may be filtered by an optional low pass filter 280 so as to produce a digital envelop signal $S_{ENV}$.

Accordingly, the signal $S_{ENV}$ is a digital representation of an envelope signal being produced in response to the filtered measurement data signal $S_F$. According to some embodiments of the Invention the optional low pass filter 280 may be eliminated.

According to the FIG. 6A embodiment of the invention the signal $S_{ENV}$ is delivered to the output 260 of pre-processor 200. Hence, according to an embodiment of the Invention the pre-processed digital signal $S_{MDP}$ delivered on the output 210 (FIG. 5) is the digital envelop signal $S_{ENV}$.

Whereas prior art analogue devices for generating an envelop signal in response to a measurement signal employs an analogue rectifier which inherently leads to a biasing error being introduced in the resulting signal, the digital enveloper 250 will advantageously produce a true rectification without any biasing errors. Accordingly, the digital envelop signal $S_{ENV}$ will have a good Signal-to-Noise Ratio, since the sensor being mechanically resonant at the resonance frequency in the passband of the digital band pass filter 240 leads to a high signal amplitude and the signal processing being performed in the digital domain eliminates addition of noise and eliminates addition of biasing errors.

With reference to FIG. 5 the pre-processed digital signal $S_{MDP}$ is delivered to input 220 of the evaluator 230.

According to another embodiment, the filter 240 is a high pass filter having a cut-off frequency $f_{LC}$. This embodiment simplifies the design by replacing the band-pass filter with a high-pass filter 240, thereby leaving the low pass filtering to another low pass filter downstream, such as the low pass filter 280. The cut-off frequency $f_{LC}$ of the high pass filter 240 is selected to approximately the value of the lowest expected mechanical resonance frequency value $f_{RMU}$ of the resonant Shock Pulse Measurement sensor 10. When the mechanical resonance frequency $f_{RM}$ is somewhere in the range from 30 kHz to 35 kHz, the high pass filter 240 may be designed to having a lower cutoff frequency $f_{LC}=30$ kHz. The high-pass filtered signal is then passed to the rectifier 270 and on to the low pass filter 280.

According to an embodiment it should be possible to use sensors 10 having a resonance frequency somewhere in the range from 20 kHz to 35 kHz. In order to achieve this, the high pass filter 240 may be designed to having a lower cutoff frequency $f_{LC}=20$ kHz.

Figure 6B:
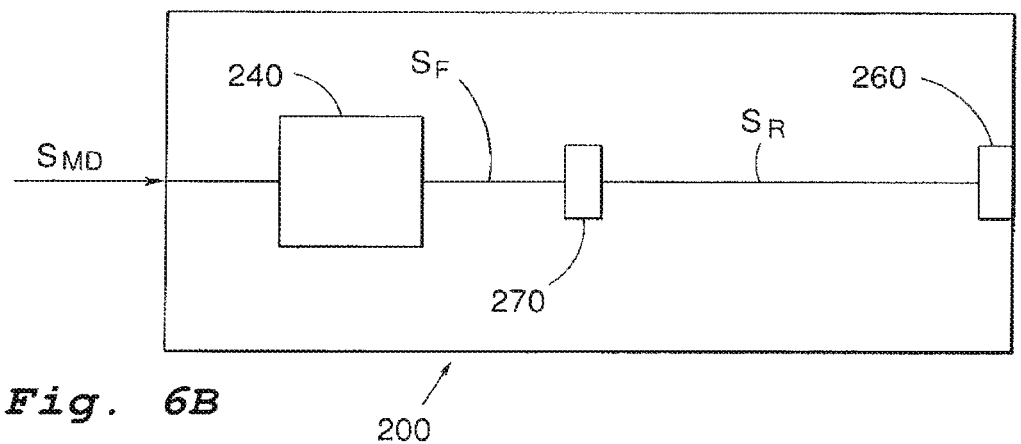
FIG. 6B illustrates an embodiment of the pre-processor including a digital rectifier.
Figure 7:
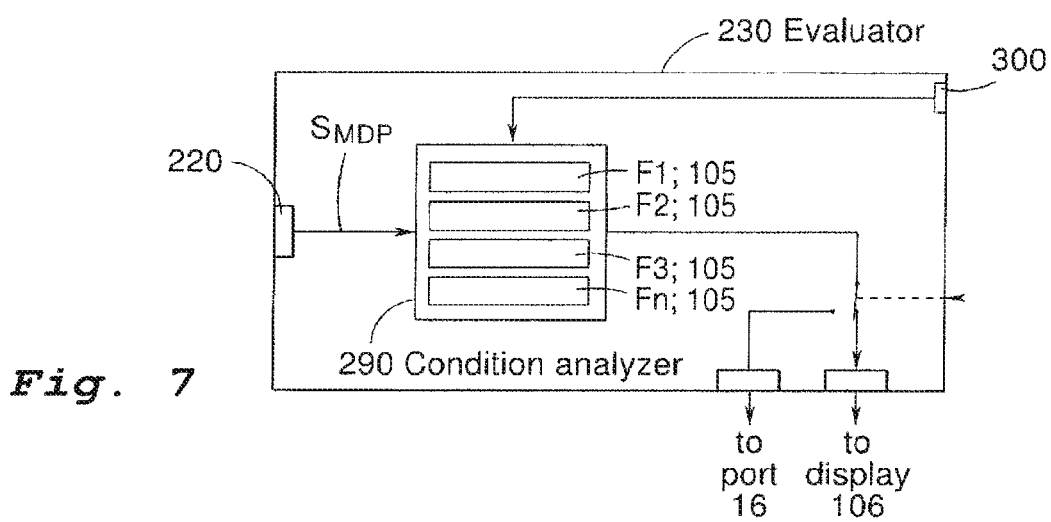
FIG. 7 illustrates an embodiment of the evaluator.

FIG. 6B illustrates an embodiment according to which the digital band pass filter 240 delivers the filtered signal $S_F$ to the digital rectifier 270, and the rectifier 270 delivers the rectified signal $S_R$ directly to a condition analyzer 290 (See FIG. 7 in conjunction with FIG. 6B).

FIG. 7 illustrates an embodiment of the evaluator 230 (See also FIG. 5). The FIG. 7 embodiment of the evaluator 230 includes the condition analyser 290 adapted to receive a pre-processed digital signal $S_{MDP}$ indicative of the condition of the machine 6. The condition analyser 290 can be controlled to perform a selected condition analysis function 105 by means of a selection signal delivered on a control input 300. Examples of condition analysis functions 105 are schematically illustrated as boxes in FIG. 7. The selection signal delivered on control input 300 may be generated by means of user interaction with the user interface 102 (See FIG. 2A).

As mentioned above, the analysis apparatus 14 may include a Peak level analysis function F3, 105 (See FIG. 4 & FIG. 7).

According to an embodiment of the invention the Peak level analysis function may be performed by the condition analyser 290 in response to activation via control input 300. In response to the peak level analysis activation signal, the analyzer 290 will activate a peak level analyzer 400 (See FIG. 7), and the digital measurement signal $S_{MDP}$ will be passed to an input of the peak level analyzer 400.

The peak level analyzer 400 is adapted to monitor the signal for the duration of a peak monitoring time $T_{PM}$ for the purpose of establishing a maximum amplitude level $A_{PR}$ indicative of the mechanical state of the monitored part, i.e. bearings 7 and/or shaft 8. The maximum amplitude level $A_{PR}$ may also be referred to as representative peak amplitude $A_{PR}$.

As mentioned above, the peak amplitude detected in the measurement signal may, when the peak amplitude value originates from a mechanical vibration in the monitored machine, be indicative of the condition of the machine. When a bearing assembly is monitored, the peak amplitude value may be indicative of the condition of the bearing assembly. In fact, the peak amplitude value may be indicative of Oil film thickness in a monitored bearing. Hence, the detected peak amplitude may be indicative of separation between the metal surfaces in the rolling interface. The oil film thickness may depend on lubricant supply and/or on alignment of the shaft. Moreover, the oil film thickness may depend on the load on the shaft, i.e. on the force with which metal surfaces are pressed together, the metal surfaces being e.g. that of a bearing and that of a shaft. The actual detected value of the maximum amplitude level may also depend on the mechanical state of the bearing surfaces.

However, the ability to correctly indicate the condition of the rotational part based on a detected peak amplitude value requires that the detected peak amplitude value really does originate from the rotational part. Machines in an industry, such as a e.g. a paper mill may be exerted to mechanical impacts from tools or other machinery, which may cause mechanical vibrations or shock waves in the monitored machine. Hence, a peak amplitude level in the digital measurement signal may be caused by the environment of the machine, in which case the actual highest amplitude value detected in the digital measurement signal may have nothing to do with the condition of the monitored machine part 8. For the purpose of this document, such peak amplitude levels in the digital measurement signal that do not depend on the mechanical state of the monitored part 8 are regarded as noise. Moreover, electrical fields in the environment of the sensor or in the vicinity of conductors of the condition analysis system may interfere to give rise to peak voltage amplitudes in the measuring signal. Such peak voltage amplitudes may also be regarded as noise.

The inventor realized that there is a particularly high noise level in the mechanical vibrations of certain machinery, and that such noise levels hamper the detection of machine damages. Hence, for some types of machinery, conventional methods for preventive condition monitoring have failed to provide sufficiently early and/or reliable warning of oncoming deteriorating conditions. The inventor concluded that there may exist a mechanical vibration $V_{MD}$ indicative of a deteriorated condition in such machinery, but that conventional methods for correctly detecting such a vibration may hitherto have been inadequate.

The inventor also realized that machines having slowly rotating parts were among the types of machinery for which conventional methods for preventive condition monitoring have failed to provide sufficiently reliable warning of oncoming deteriorating conditions.

Having realized that a particularly high noise level in the mechanical vibrations of certain machinery hampers the detection of machine damages, the inventor came up with a method for enabling a more reliable detection of a signal peak amplitude level which is indicative of an incipient damage of a rotational part 8 of the monitored machine 6.

However, tests have indicated that, even in a laboratory environment where there is very little or no noise, the detected peak level for a rotational part often varies, i.e. each revolution of a rotational shaft does not produce identical peak levels. After careful study of such amplitude levels the inventor concluded that the amplitude levels emanating from rotation of a monitored rotational part closely follow the normal distribution, also referred to as the Gaussian distribution; and that it is necessary to record the amplitude levels originating from plural revolutions of a rotational part in order to detect a relevant true peak value which may be used for accurate determination of the condition of the monitored rotational part.

In this context, it should be noted that the normal distribution is a probability distribution that describes data that cluster around the mean. The graph of the associated probability density function is bell-shaped, with a peak at the mean, and is known as the Gaussian function or bell curve.

FIG. 8 is a schematic illustration of a rectified signal $S_R$ that could be delivered by rectifier 270 (FIG. 6B) to peak analyzer 400 (FIG. 7). FIG. 5 in conjunction with FIG. 6B and FIG. 7 provide an overview of an embodiment of the analysis apparatus. The peak level analysis F3 (See FIG. 7 & FIG. 4) is adapted to monitor the signal for the duration of a peak monitoring period $T_{PM}$ for the purpose of establishing a relevant maximum amplitude level. In the example illustrated in FIG. 8 the monitoring period $T_{PM}$ corresponds to 14 revolutions of the monitored rotational part. Single revolutions of the monitored rotational part are indicated by reference 405 in FIG. 8.

Accordingly, by defining the monitoring period $T_{PM}$ in terms of a number of revolutions of the rotational part to be monitored, rather than in terms of a certain time period, the quality of the analysis in improved. More precisely, the inventor realized that when the number of detected peak values $A_P$ is seen in relation to the amount R of revolution of the monitored rotatable part during the measurement, statistical methods may be employed so as to achieve an increased quality of the resulting peak amplitude value.

The inventor realized that if the distribution of detected peak amplitude values $A_P$ resembles the Gaussian distribution it could be concluded that one revolution of a shaft may result in a different set of peak amplitude values than another revolution of the same shaft.

An embodiment of the method comprises the steps of:

receiving a first digital signal dependent on mechanical vibrations emanating from rotation of said part;

analysing said first digital signal so as to detect peak amplitude values Ap during a finite time period $T_{PM}$, said finite time period corresponding to a certain amount R of revolution of said rotatable part. The certain amount R of revolution should correspond to more than one revolution of said monitored rotatable part. The method further comprises defining a plurality $N_R$ of amplitude ranges $R_A$;

sorting said detected peak amplitude values Ap into corresponding amplitude ranges $R_A$ so as to reflect occurrence N of detected peak amplitude values Ap within said plurality of amplitude ranges.

FIG. 9 illustrates a histogram resulting from a measurement wherein the measuring time period $T_{PM}$ corresponded to fourteen (R=14) revolutions of the monitored rotatable part under laboratory conditions without any noise, i.e. each one of the illustrated black dots corresponds to one detected peak amplitude value $A_P$. Hence, the "certain amount of revolution" is R=14.0 revolutions, and the finite time period $T_{PM}$ was the time it took for the monitored part 8 to revolve 14 revolutions. The monitored part 8 may be a shaft. Hence, according to embodiments of the invention the measuring time period $T_{PM}$ may depend on the speed of rotation of the rotatable part so that when the monitored rotational part rotates at slower speed the measuring time period $T_{PM}$ will be longer, and when the monitored rotational part rotates at higher speed the measuring time period $T_{PM}$ will be shorter.

Based on the knowledge that the measurement was made during R=14 full revolutions of the monitored part, and assuming that a highest peak amplitude value is detected once per revolution, it can be seen from FIG. 9 that the top fourteen (14) detected amplitude values do vary a bit, the highest amplitude being indicated by reference 410 and the 14$^{th}$ highest amplitude range being indicated by reference 420. Hence, from FIG. 9 it may be deduced that the peak amplitude value $A_P$ detected during one revolution often differs from the peak amplitude value detected during another revolution. In other words, if measurement were done during a single revolution, then plural single-revolution-measurements on the same shaft would result in rather large variations in the detected peak value.

The Inventor realized that it is desirable to achieve a measurement procedure which is reliable in the sense that it should provide repeatable results. Hence, when the measurement procedure is repeatedly performed on the same rotational part so that plural monitoring periods $T_{PM1}$, $T_{PM2}$, $T_{PM3}$, $T_{PM4}$, $T_{PM5}$ result in measurement results in the form of plural representative peak amplitude values $A_{PR1}$, $A_{PR2}$, $A_{PR3}$, $A_{PR4}$ being produced in immediate temporal succession, then it is desirable that these plural representative peak amplitude values $A_{PR1}$, $A_{PR2}$, $A_{PR3}$, $A_{PR4}$ have substantially the same numerical value.

Finite Time Period for Peak Value Detection

By performing numerous test measurements in a laboratory environment where there is very little or no noise, the inventor concluded that it is desirable to monitor a rotating part for the during a finite time period $T_{PM}$ corresponding to several revolutions R in order to detect a true peak amplitude value $A_{PT}$ which is indicative of the mechanical state of the monitored part, i.e. bearings 7 and/or shaft 8. In this context the true peak amplitude value $A_{PT}$ is true in the sense that it truly originates from a mechanical vibration $V_{MD}$ caused by a relative movement between metal surfaces in a monitored part, such as e.g. a bearing ball and an inner ring surface, and not from any noise or disturbance. In effect the selection of the value for the parameter R is a question which needs careful weighing up, since monitoring during a single revolution, i.e. R=1, is likely to result in a too low peak amplitude value $A_{PT}$ which therefore may be inadequate for indicating the mechanical state of the monitored rotating part. On the other hand, if the rotating part is monitored for an extremely long time, nearing eternity in statistical terms, the detected peak amplitude value $A_{PT}$ will slowly increase to infinity, which in reality means that after an extremely long period of operation a rotating part associated with a bearing assembly will break. Accordingly, the inventor concluded that it is necessary to find a balanced value for the parameter R, so as to on the one hand having a high enough R-value to detect a true peak amplitude value $A_{PT}$ which is indicative of the mechanical state of the monitored part, while on the other hand a low enough R-value so as to keep the duration of the measuring time period $T_{PM}$ at a reasonable finite duration.

Based on numerous test measurements in substantially noise free conditions, the inventor concluded that it is desirable to monitor a rotating part during a finite time period $T_{PM}$ corresponding to a certain amount R of revolution of said rotatable part; said certain amount R of revolution corresponding to at least eight (R=8) revolutions of said monitored rotatable part in order to actually detect a true peak amplitude value $A_{PT}$ which is indicative of the mechanical state of the monitored part. Based on these test measurements, the Inventor concluded that monitoring the rotating part during a finite time period $T_{PM}$ corresponding to at least ten (R=10) revolutions of said monitored rotatable part renders a more accurate true peak amplitude value $A_{PT}$, i.e. a true peak amplitude value Apr which is more accurately indicative of the mechanical state of the monitored part. This conclusion is based on tests indicating that a further increase of the monitoring time period $T_{PM}$ to a finite duration of more than ten (R=10) revolutions, in an environment free from noise, may lead to a detection of a higher true peak amplitude value $A_{PT}$, but the increase in detected true peak amplitude value $A_{PT}$ is small in relation to the increased monitoring time period $T_{PM}$.

When measuring and collecting peak amplitude values $A_P$ during a time period $T_{PM}$ corresponding to R=14 full revolutions of the monitored part, and thereafter organising the peak amplitude values $A_P$ in a histogram, as illustrated in FIG. 9, the peak amplitude values $A_P$ sorted into the amplitude level 420 for the 14.th highest detected amplitude is very stable. It can be seen from the histogram in FIG. 9 that four peak amplitudes were detected at that amplitude range 420. Accordingly, a stable measurement value, i.e. repeatedly providing substantially the same peak amplitude when performing plural measurements on the same rotating part, may be achieved by focusing on the R:th highest amplitude, wherein R is a number indicative of the number of revolutions performed by the monitored part during the peak level monitoring time $T_{PM}$.

An embodiment of the invention therefore includes a method of operating an apparatus for analysing the condition of a machine having a part rotating with a speed of rotation $f_{ROT}$ comprising the steps of:

receiving a first digital signal $S_{MD}$, $S_R$, $S_F$ dependent on mechanical vibrations emanating from rotation of said part;

analysing said first digital signal so as to detect peak amplitude values Ap during a finite time period $T_{Pm}$, said finite time period corresponding to a certain amount R of revolution of said rotatable part; said certain amount R of revolution corresponding to more than one revolution of said monitored rotatable part;

sorting said detected peak amplitude values Ap into corresponding amplitude ranges so as to reflect occurrence N of detected peak amplitude values Ap within a plurality $N_R$ of amplitude ranges;

estimating a representative peak amplitude value $A_{PR}$ In dependence on said sorted peak amplitude values Ap and said certain amount R.

According to an advantageous embodiment the estimation includes selecting the R:th highest amplitude to be said representative peak amplitude value $A_{PR}$.

Reducing or Eliminating Noise

FIG. 10 illustrates a histogram resulting from a measurement wherein the peak level monitoring time $T_{PM}$ corresponded to fourteen (14) revolutions of the monitored rotatable part. The FIG. 10 histogram is the result of an experiment wherein two very high amplitude mechanical disturbances 430, 440 were generated during the peak level monitoring time $T_{PM}$ The two signal peaks corresponding to the two very high amplitude mechanical disturbances 430, 440 are also illustrated in FIG. 8. It is to be understood that the two high amplitude mechanical disturbances 430, 440 were not caused by any damage in the monitored rotational part. Hence, the two high amplitude mechanical disturbances 430, 440 are to be regarded as noise.

Experience and a multitude of measurements have indicated that when monitoring a machine having a part rotating with a speed of rotation the highest peak amplitude value emanating from an incipient damage is a very relevant amplitude value for the purposes of predictive maintenance.

However, since the highest peak amplitude value does not appear every time the monitored shaft revolves one full revolution, it will be necessary to monitor a rotatable part for the duration of a time allowing plural revolutions. Unfortunately, however, in a real life situation a longer measuring time often increases the noise level in the measuring signal. In an industrial environment, such as a paper mill, other machinery in the vicinity of the monitored machine may cause mechanical vibrations or shock pulses from time to time, and the longer the measuring time the greater the risk that such external mechanical vibrations cause the highest detected peak amplitude levels. For these reasons the measurement procedure, intended to provide a reliable and repetitively achievable representative peak amplitude value, needs to satisfy the opposing requirements of:

on the one hand involving measurement over sufficiently long time to collect peak amplitude values over plural revolutions of the monitored rotational part so as to collect a peak amplitude value which is representative of the highest peak amplitude value caused by the condition of the monitored rotational part, while on the other hand avoiding the measurement procedure requiring such a long time that noise caused by e.g. other machinery in an industrial environment corrupts the measurement results.

According to an embodiment of the invention the R:th highest amplitude is selected to be a representative peak amplitude value $A_{PR}$. This embodiment advantageously leads to reduced or eliminated impact of high amplitude noise on the resulting representative peak amplitude value $A_{PR}$. This advantageous effect is understood by studying and comparing FIGS. 9 and 10. Both of the histograms of FIGS. 9 and 10 illustrate a histograms resulting from a measurement duration period $T_{PM}$, said measurement duration period $T_{PM}$ corresponding to a certain amount R=14 revolutions of said rotatable part. FIG. 9 illustrates a histogram resulting from a measurement without any noise, whereas FIG. 10 illustrates a histogram resulting from another measurement where high amplitude noise was introduced during the measurement. Selection of the R:th highest amplitude as representative peak amplitude value $A_{PR}$ leads to repeatable results, even when exerted to noise. Hence, when the measurement procedure is repeatedly performed on the same rotational part so that plural monitoring periods $T_{PM1}$, $T_{PM2}$, $T_{PM3}$, $T_{PM4}$, $T_{PM5}$ result in measurement results in the form of plural representative peak amplitude values $A_{PR1}$, $A_{PR2}$, $A_{PR3}$, $A_{PR4}$ being produced in immediate temporal succession, these plural representative peak amplitude values $A_{PR1}$, $A_{PR2}$, $A_{PR3}$, $A_{PR4}$ have substantially the same numerical value, when the R:th highest amplitude is selected to be a representative peak amplitude value $A_{PR}$ and the measurement duration periods $T_{PM1}$, $T_{PM2}$, $T_{PM3}$, $T_{PM4}$, $T_{PM5}$ correspond to R revolutions of said rotatable part. Starting from the right hand side and identifying 14:th highest amplitude value, leads to substantially the same amplitude level, both in the case of FIG. 9 and FIG. 10. Hence, the amplitude level of the R:th highest amplitude value may advantageously be selected representative peak amplitude value $A_{PR}$, according to an embodiment.

However, the nature of the Gaussian function or bell curve is such that the frequency of low amplitude values actually can tell us something about the amplitude of the not-so-frequent highest peak amplitude values.

According to an aspect of the Invention, the method includes estimating a representative peak amplitude value ($A_{PR}$) independence on said sorted peak amplitude values (Ap) and said certain amount (R).

According to an embodiment the estimation step includes the creation of an accumulated histogram.

Setting Up an Analysis Apparatus for Performing Peak Level Analysis

Figure 11A:
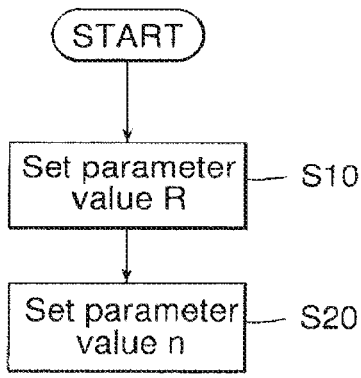
FIG. 11A is a flow chart illustrating an embodiment of a method of operating the apparatus so as to set it up for performing peak level condition analysis.

FIG. 11A is a flow chart illustrating an embodiment of a method of operating the apparatus 14 so as to set it up for performing peak level condition analysis. The method according to FIG. 11A may be performed when an embodiment of the analysis function F3 (See FIG. 4 & FIG. 7) is run on the processor 50 (See FIG. 2A).

In a step S10 a parameter value R is set, and in another optional step S20 a parameter n may be set. According to an embodiment the parameter values R and n, respectively, may be set in connection with the manufacturing or in connection with delivery of the measurement apparatus 14. Accordingly the parameter values R and n may be preset by the manufacturer of apparatus 14, and these values may be stored in the non-volatile memory 52 or in the non-volatile memory 60 (See FIG. 2A).

Alternatively, the parameter values R and n may be set by the user of the apparatus 14 prior to performing a measurement session. The parameter values R and n may be set by the user by means of the user interface 102, 107 described in connection with FIG. 2A.

A Method of Measurement and Data Collection

Figure 11B:
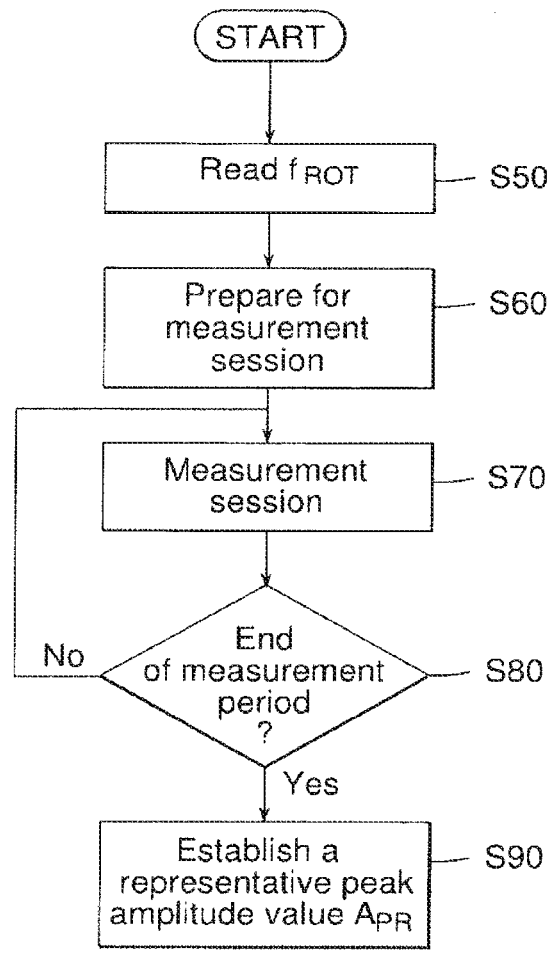
FIG. 11B is a flow chart illustrating an embodiment of a method of operating the apparatus so as to perform peak level condition analysis.

FIG. 11B is a flow chart illustrating an embodiment of a method of operating the apparatus 14 so as to perform peak level condition analysis. The method according to FIG. 11B may be performed when an embodiment of the analysis function F3 (See FIG. 4 & FIG. 7) is run on the processor 50 (See FIG. 2A).

In a step S50 a current speed value $f_{ROT}$ is read, and stored in a data memory 52. When the part 8 to be monitored is rotating with a constant speed of rotation, the speed value $f_{ROT}$ may be entered by a user via the user interface 102

(FIG. 2A). When the rotational speed $f_{ROT}$ of the monitored part is variable, a speed detector 450 (See FIG. 1 & FIG. 5) may be provided to deliver a signal indicative of the speed of rotation $f_{ROT}$ of the shaft 8. The speed of rotation $f_{ROT}$ of the shaft 8 may be provided in terms of revolutions per second, rps, i.e. Hertz (Hz) to an input 460 of means 180 for digital signal processing (See FIG. 5) so that it can be used by the processor 50 (See FIG. 2A) when running the program to execute the peak amplitude analysis function.

In step S60 additional preparations for the measurement session step S70 are performed.

The preparations of step S60 may include preparing a suitable table 470 for data to be collected. FIG. 13B is a schematic illustration of plural memory positions arranged as a table 470, and suitable for storage of data to be collected. The table 470 may be stored in the memory 52 (FIG. 2A) or in a memory internal to the processor 50.

Figure 13A:
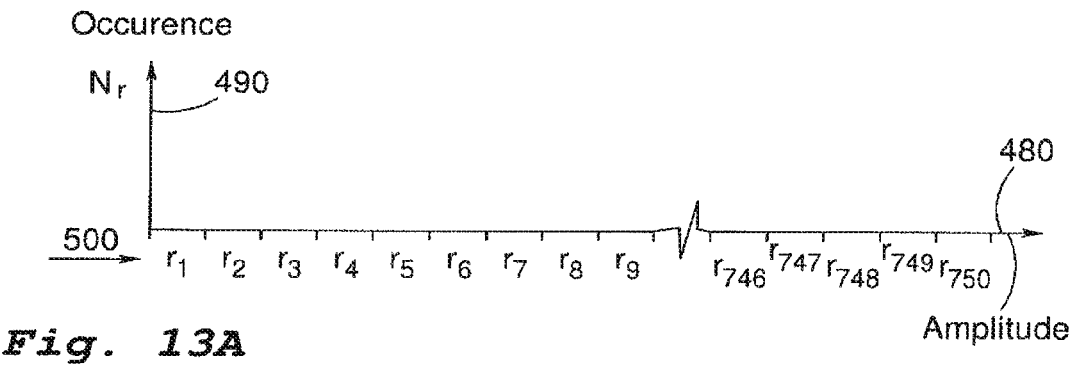
FIG. 13A illustrates a histogram having plural amplitude bins.
Figure 13B:
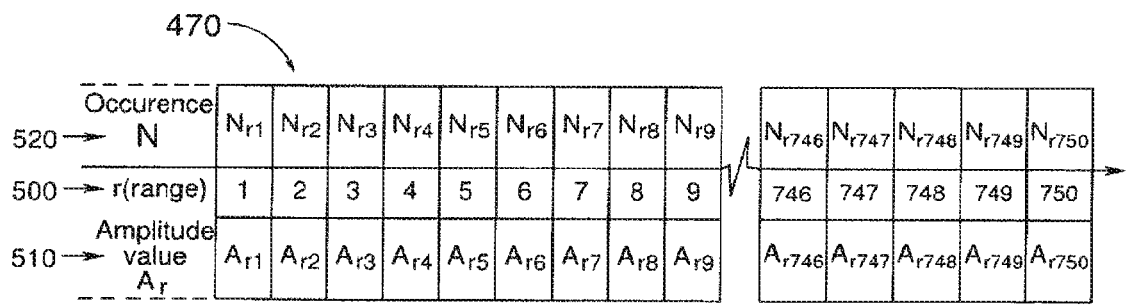
FIG. 13B is a schematic illustration of plural memory positions arranged as a table.

FIG. 13A illustrates a histogram having plural amplitude bins 500, individually referred to by references r1 to r750, each amplitude bin r1 . . . r750 representing an amplitude level $A_r$. Although FIG. 13 shows 750 (seven hundred and fifty) amplitude bins, that is just an example value. The number of amplitude bins may be set to a suitable number in step S60 (FIG. 11B) by the user, via user interface 102 (FIG. 2A). FIG. 13A is comparable with FIG. 10, both figures illustrating a number of amplitude bins along one axis 480, and occurrence of detected peak amplitude values along another axis 490. However, in the illustration of FIG. 13A no values have been plotted in the histogram. The amplitude axis 480 may have a certain resolution, which may also be settable by the user, via the user interface 102. Alternatively the resolution of the amplitude axis 480 may be preset. According to an embodiment the resolution of the amplitude axis 480 may be set to 0.2 dB, and the amplitudes to be recorded may span from a lowest amplitude of $A_{r1}=-50$ dB to a highest amplitude value $A_{r750}=+100$ dB.

With reference to FIG. 13B, the Illustrated table is a representation of the histogram shown in FIG. 13A, having amplitude bins 500, individually referred to by references r1 to r750, each amplitude bin r1 . . . r750 representing an amplitude level $A_r$. The table 470 also includes memory positions 510 for amplitude values Ar, and memory positions 520 for variables $N_r$, reflecting the occurrence.

Bin r1 is associated with an amplitude value $A_{r1}$ and with a memory position for a variable $N_{r1}$ for storing a value indicating how many times the amplitude Ar1 has been detected.

In step S60 (FIG. 11B), before the start of a measuring session S70, all the occurrence variables $N_{r1}$ to $N_{r750}$ may be set to zero (0). Thereafter the measuring session S70 may begin.

The measuring session s70 may include receiving a first digital signal $S_R$, $S_{MDP}$ dependent on mechanical vibrations emanating from rotation of said part (See FIG. 6B & FIG. 7); and analysing said first digital signal $S_R$, $S_{MDP}$ so as to detect peak amplitude values Ap during a finite time period $T_{Pm}$, said finite time period corresponding to a certain amount R of revolution of said rotatable part 8; said certain amount R of revolution corresponding to more than one revolution of said monitored rotatable part; and sorting said detected peak amplitude values Ap into corresponding amplitude ranges 500 so as to reflect occurrence N of detected peak amplitude values Ap within said plurality of amplitude ranges 500 (See FIG. 13B).

The duration of the measurement session is controlled in dependence of the amount of revolution of the rotating part, so that the rotating part rotates at least R revolutions, as mentioned above. Step S80 in FIG. 11B represents the step of controlling the duration of the finite time period $T_{Pm}$ accordingly. A revolution counter may be provided to monitor the signal $f_{ROT}$ so as to ascertain that the measurement session continues for the duration of the finite time period $T_{Pm}$, corresponding to the certain amount R of revolution of said rotatable part 8. Alternatively, the detector 450 may generate a signal indicative of the amount of revolution, and the duration of measurement may be controlled solely in dependence on the amount of revolution of the rotatable part 8, irrespective of time. Alternatively, the duration $T_{Pm}$ of the measurement session is controlled in dependence of time information provided by the clock 190 (FIG. 5) in conjunction with speed of rotation information $f_{ROT}$ delivered by detector 450 so that the duration $T_{Pm}$ is adapted to ensure that the monitoring is performed for the desired amount of rotation n*R. In this connection it is noted that R is a positive number larger than one, and n is a positive number equal to one (1) or larger than one (1). The parameter R may be an Integer, but it may alternatively be a decimal number. The parameter n may be an integer, but it may alternatively be a decimal number. In the example shown in FIG. 8 above, parameter R=14 and parameter n=1.

In a step S90 (FIG. 11B) a representative peak amplitude value $A_{PR}$ is established on the basis of the peak amplitude values Ap collected in the measurement session S70.

FIG. 12A is a flow chart illustrating an embodiment of a method of performing step S70 so as to perform the peak level measurement session.

In a step S100 a digital signal $S_R$, $S_{MDP}$ dependent on mechanical vibrations is received by peak level analyzer 400 (See FIG. 7). When a signal peak is detected (Step S110), the peak amplitude value of the detected peak is measured (Step S120), and a corresponding amplitude range also referred to as amplitude range bin, is identified in step S130 (See FIG. 12A in conjunction with FIG. 13B).

In a step S140 the corresponding occurrence counter value Nri is increased by one unit so as to reflect detection of a peak in that amplitude range bin $r_i$.

Thereafter step S80 In FIG. 11B is performed so as to determine whether the measuring session is complete or should continue. If is to continue, then steps S100 to S140 are repeated, i.e. step S70 In FIG. 11 is performed again.

When step S80 determines that the measurement session is complete, a representative peak amplitude value $A_{PR}$ is established (S90) on the basis of the peak amplitude values Ap collected in the measurement session S70, as mentioned above.

According to an embodiment, the representative peak amplitude value $A_{PR}$ is compared with a reference value such that the comparison is indicative of the condition of the monitored part. The reference value may be a preset value corresponding to the monitored part. According to an embodiment, the reference value may be a representative peak amplitude value $A_{PR}$ which was established by measurement on the same the monitored part at an earlier time, e.g. when the part was new or freshly renovated. According to an embodiment the above described functions F7=storage of condition data in a writeable information carrier on said machine, and/or F8=storage of condition data in a writeable information carrier 52 in said apparatus, and/or F12=Retrieval of condition data from a writeable information carrier 58 on said machine and/or F13=Performing Peak level analysis F3 and performing function F12 "Retrieval of condition data from a writeable information carrier 58 on said machine" so as to enable a comparison or trending based on current Peak level data and historical Peak level data, are employed.

Establishing Further Improved Representative Peak Value and Noise Rejection

Whereas the measurement results as illustrated in FIG. 9 reflect a highest peak amplitude 410 detected during R=14 revolutions under substantially noise free conditions, the highest peak 430 in the measurement session illustrated in FIG. 10, detected during R=14 revolutions, was generated in response to a disturbance, i.e. it reflects noise, and as such the peak 430 does not carry any information about the condition of the rotating part 8. Accordingly, it is desirable to obtain a representative peak amplitude value $A_{PR}$ which is based on signal values reflecting measurement values delivered by the sensor 10 in dependence on vibrations emanating from the shaft and/or bearing when the shaft rotates. In particular when it comes to measurement on slowly rotating parts, which inherently requires a longer measuring period $T_{PM}$ when measurement is to be performed over a certain predetermined amount of revolution R, the amount of noise may also be increased due to the longer duration of the measuring session required because of the slower rotational speed. Hence, there exists a need for a sturdy measurement method capable of rejecting noise.

In a wind turbine application the shaft whose bearing is analyzed may rotate at a speed of less than 120 revolutions per minute, i.e. the shaft rotational frequency $f_{ROT}$ is less than 2 revolutions per second (rps). Sometimes such a shaft to be analyzed rotates at a speed of less than 50 revolutions per minute (rpm), i.e. a shaft rotational frequency $f_{ROT}$ of less than 0.83 rps. In fact the speed of rotation may typically be less than 15 rpm. Whereas a shaft having a rotational speed of 1715 rpm, as discussed in the above mentioned book, produces 500 revolutions in just 17.5 seconds; a shaft rotating at 50 revolutions per minute takes ten minutes to produce 500 revolutions. Certain large wind power stations have shafts that may typically rotate at 12 RPM=0.2 rps. At 12 rpm it takes more than four minutes to complete fifty revolutions, and accordingly the risk for impact noise occurring during the measurement is a lot higher when the peak level analysis is to be performed on a rotating part having such a low rotational speed. Similarly certain machine parts in paper mills also rotate at a speed of less than 50 rpm.

As mentioned above, the inventor concluded that it is desirable to monitor a rotating part during a finite time period $T_{PM}$ corresponding to a certain amount R of revolution of said rotatable part; said certain amount R of revolution corresponding to plural revolutions of said monitored rotatable part in order to actually detect a peak amplitude value $A_{PT}$ which is indicative of the mechanical state of the monitored part. However, the inventor concluded that it is preferable to monitor a rotating part during a finite time period $T_{PM}$ corresponding to a certain amount R of revolution of said rotatable part; said certain amount R of revolution corresponding to at least eight (R=8) revolutions of said monitored rotatable part in order to actually detect a true peak amplitude value $A_{PT}$ which is indicative of the mechanical state of the monitored part. This conclusion was based on numerous test measurements in substantially noise free conditions. Hence, monitoring a rotating part during a finite time period $T_{PM}$ corresponding to at least n*R revolutions, wherein n is a number having a numerical value of at least two and R has a numerical value of at least 8, and selecting the n:th highest detected peak amplitude as a representative peak amplitude value $A_{PR}$, will deliver a measured peak amplitude value $A_{PR}$ which statistically occurs once in R revolutions, while rejecting the n−1 highest peak values as potential noise peaks. Accordingly, this embodiment of the Invention renders a peak amplitude value $A_{PR}$ which is very accurately indicative of the mechanical state of the monitored part.

As mentioned above, the inventor also concluded, based on the test measurements, that monitoring the rotating part during a finite time period $T_{PM}$ corresponding to at least ten revolutions (R=10) of said monitored rotatable part may render an even more accurate true peak amplitude value $A_{PT}$, i.e. a true peak amplitude value $A_{PT}$ which is more accurately indicative of the mechanical state of the monitored part. Moreover, the inventor concluded that the tests indicate that a further increase of the monitoring time period $T_{PM}$ to a finite duration of more than ten revolutions (R>10), in an environment free from noise, may lead to a detection of a higher true peak amplitude value $A_{PT}$, but the increase in detected true peak amplitude value $A_{PT}$ is small in relation to the increased monitoring time period $T_{PM}$.

Accordingly, the Inventor concluded that a problem to be solved is: How to identify a peak amplitude value which statistically occurs once in R revolutions, while satisfying the conflicting requirements of obtaining as accurate as possible a measured peak amplitude value and while minimizing the measuring duration and achieving rejection of peaks that are due to noise.

Figure 14A:
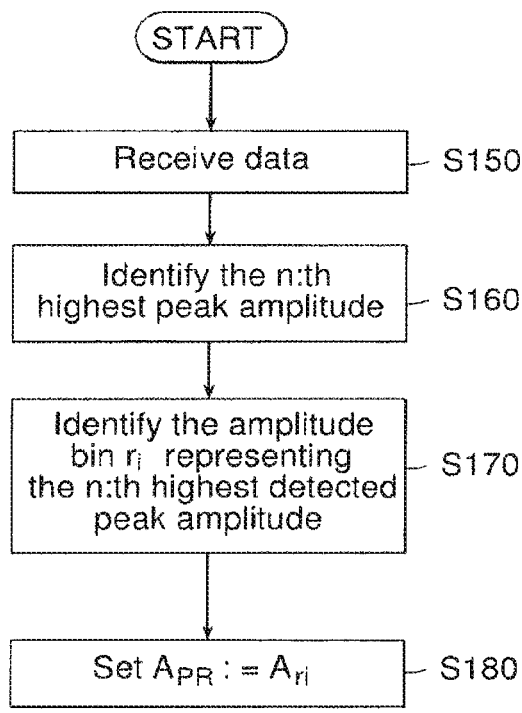
FIG. 14A is a flow chart illustrating an embodiment of a method for establishing a representative peak amplitude value on the basis of the peak amplitude values Ap collected in the measurement session.

FIG. 14A is a flow chart illustrating an embodiment of a method for establishing a representative peak amplitude value $A_{PR}$ on the basis of the peak amplitude values Ap collected in the measurement session S70 (See FIG. 11A). The method of the FIG. 14A embodiment illustrates a manner by which high amplitude noise may be rejected. Accordingly the method according to FIG. 14A may advantageously be employed for peak level analysis of rotatable parts having a speed of less than 50 rpm.

Figure 13C:
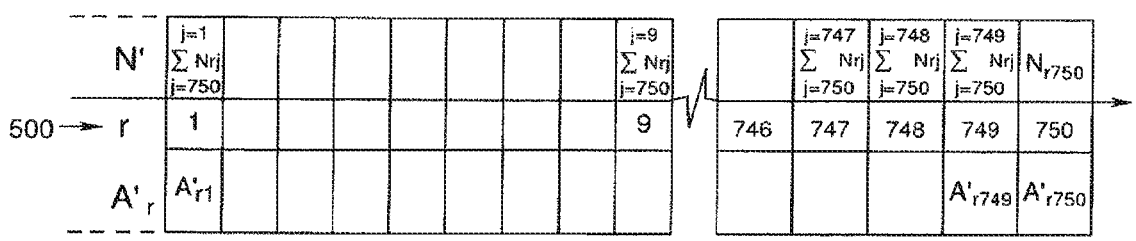
FIG. 13C is an illustration of a cumulative histogram table corresponding to the histogram table of FIG. 13B.

In a step S150 data relevant for the analysis is read. This includes the value of the parameter R, used in the measuring session S70, and the value of the parameter n. It may also include the peak value measurement data in histogram format, as illustrated in FIG. 13A, 13B or 13C. The peak value measurement data to be analyzed may be the data collected as described above, e.g. in connection with steps S70 & SS0 above and/or as described in connection with FIG. 12A or 12B.

In step S160, identify the top n:th highest detected peak amplitude value. Referring to FIG. 13B, and assuming data is sorted so that the highest amplitude bin is at the right hand side of the FIG. 13B table (i.e. amplitude $A_{r750}$, associated with bin $r_{750}$, represents the highest detectable amplitude value), this means beginning with occurrence $N_{r750}$, moving left and adding occurrence values $N_{ri}$ until the sum equals n. Having found the n:th highest detected amplitude, the subsequent step S170 includes identifying the amplitude bin $r_i$ representing the n:th highest detected peak amplitude value and the corresponding amplitude value $A_{ri}$.

In the subsequent step S180, select the identified amplitude value $A_{ri}$ to be an estimate of the representative peak amplitude $A_{PR}$:

$$A_{PR} := A_{ri}$$

Accordingly, an embodiment of the invention includes a method of operating an apparatus for analysing the condition of a machine having a part rotating with a speed of rotation $f_{ROT}$, comprising the steps of:

receiving a first digital signal $S_{MD}$, $S_R$, $S_F$ dependent on mechanical vibrations emanating from rotation of said part;

analysing said first digital signal so as to detect peak amplitude values Ap during a finite time period $T_{Pm}$, said finite time period corresponding to a certain amount of revolution of said rotatable part; said certain amount of revolution corresponding to more than one revolution of said monitored rotatable part;

sorting each said detected peak amplitude value Ap into a corresponding amplitude bin 500, $r_1$-$r_{750}$ (See FIGS. 13B and 13C) so as to reflect occurrence N of detected peak amplitude values Ap within a plurality $N_R$ of amplitude ranges;

estimating a representative peak amplitude value $A_{PR}$ in dependence on said sorted peak amplitude values Ap and said certain amount of revolution; wherein said certain amount of revolution includes at least n*R revolutions, wherein n is a number having a numerical value of at least two and R corresponds to several revolutions, and wherein the estimation step includes selecting the n:th highest detected peak amplitude as a representative peak amplitude value $A_{PR}$.

This solution advantageously rejects the n−1 highest amplitude peak values as noise, and delivers the n:th largest amplitude peak value as a representative peak amplitude value $A_{PR}$. According to this embodiment the duration of a measurement session, expressed in number of revolutions, will be n*R, and the number of rejected noise peak values is n−1.

According to an embodiment, n is a number having a numerical value of at least two and R has a numerical value of at least 8, rendering measurement and collection of peak amplitude values during at least *R=2*8=16 revolutions of the monitored part (Steps S70 and S80 in FIG. 11B).

According to a preferred embodiment, referring to steps S10 and S20 in FIG. 11A, the parameter R is set to at least 10, and parameter n is set to 5, rendering measurement and collection of peak amplitude values during n*R=5·10=50 revolutions of the monitored part (Steps S70 and S80 in FIG. 11B).

If a true peak value is generated at least once in R revolutions, and there is also some high amplitude noise in the form of false peak values, then according to this embodiment the four highest peak values may be rejected and the method will still identify a true peak value in the form of the n:th largest detected peak value, i.e. the fifth largest detected peak value. Accordingly, assuming that the amount of high amplitude disturbance results in at the most four of the top five peak values, this embodiment delivers the amplitude of the 5:th largest peak value as a representative peak amplitude value $A_{PR}$.

According to preferred embodiments of the invention the parameter R may take values of 8 or higher, and the parameter n may have values of 2 or higher. According to these embodiments the duration of a measurement session, expressed in number of revolutions, will be n*R, and the number of rejected noise peak values is n−1.

The below Table 1 illustrates a few examples of combinations of parameter settings for R and n, together with resulting duration of measuring session and the corresponding capability of noise rejection.

TABLE 1

| R | n | Duration of measurement session (revolutions) | Number of rejected noise peaks |
|---|---|---|---|
| 8 | 5 | 40 | 4 |
| 9 | 5 | 45 | 4 |
| 10 | 5 | 50 | 4 |

TABLE 1-continued

| R | n | Duration of measurement session (revolutions) | Number of rejected noise peaks |
|---|---|---|---|
| 10 | 6 | 60 | 5 |
| 10 | 7 | 70 | 6 |
| 10 | 8 | 80 | 7 |
| 10 | 9 | 90 | 8 |
| 10 | 10 | 100 | 9 |
| 10 | 11 | 110 | 10 |
| 10 | 12 | 120 | 11 |
| 10 | 13 | 130 | 12 |
| 10 | 14 | 140 | 13 |
| 9 | 6 | 54 | 5 |
| 9 | 7 | 63 | 6 |
| 9 | 8 | 72 | 7 |
| 9 | 9 | 81 | 8 |
| 9 | 10 | 90 | 9 |
| 9 | 11 | 99 | 10 |
| 9 | 12 | 108 | 11 |

However, the inventor also concluded that since the distribution of true peak amplitude values emanating from rotation of a monitored rotational part closely follow the normal distribution, it may be possible to estimate a peak amplitude value which statistically occurs seldom, on the basis of detected peak amplitude values which occur more frequently. On the basis of this realization, the inventor proceeded to develop a further advantageous manner of estimating a representative peak amplitude value $A_{PR}$ in dependence on the sorted peak amplitude values Ap and the amount R of rotation of the monitored part, as discussed below in connection with FIG. 14B.

Yet a Further Improved Representative Peak Value and Noise Rejection

Figure 14B:
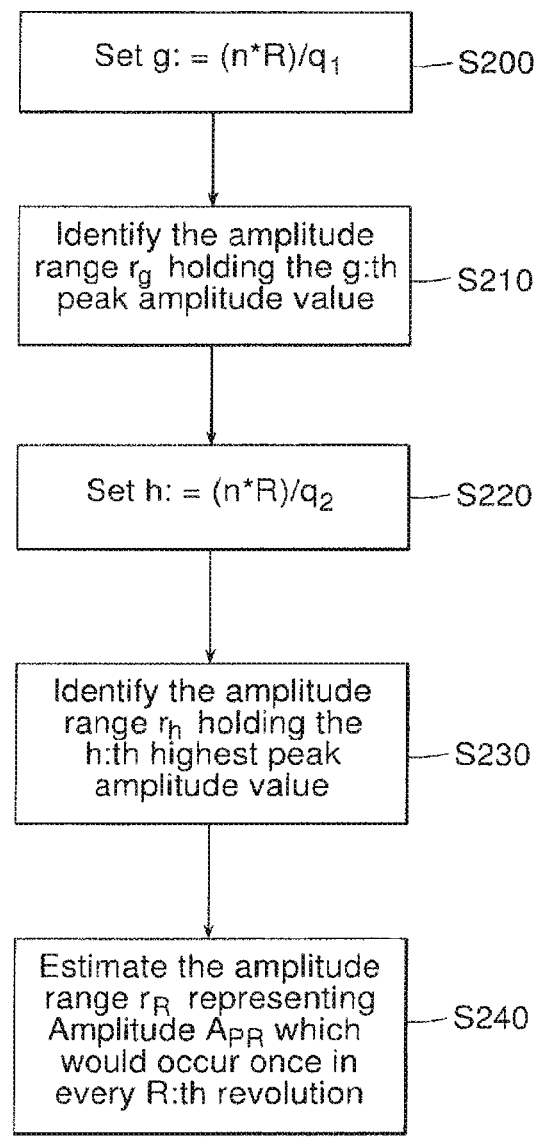
FIG. 14B is a flow chart illustrating yet an embodiment of a method for estimating a representative peak amplitude value $A_{PR}$ on the basis of the peak amplitude values Ap collected in the measurement session.

FIG. 14B is a flow chart illustrating yet an embodiment of a method for estimating a representative peak amplitude value $A_{PR}$ on the basis of the peak amplitude values Ap collected in the measurement session S70. The method of FIG. 14B may be an embodiment of step S90 of FIG. 11B.

In a step S200 a parameter g is set to a value $(n*R)/q_1$:

$$g := (n*R)/q_1$$

The parameter $q_1$ may have a numerical value 1 or more than 1. According to embodiments of the invention parameter $q_1$ is preset to a value of between one (1) and three (3).

In a step S210, an amplitude range $r_g$ (See FIG. 13) holding the g:th largest detected peak amplitude value is identified.

In a step S220 a parameter h is set to a value $(n*R)/q_2$:

$$h = n*R/q_2$$

According to embodiments of the invention, the parameter 'h is preset to a value of between two (2) and five (5). According to an embodiment the parameter $q_2$ may have a numerical value four (4). The value of parameter $q_2$ is always larger than the value of parameter $q_1$:

$$q_2 > q_1$$

In a step S230, an amplitude range $r_h$ (See FIG. 13) holding the h:th largest detected peak amplitude value is identified.

In a step S240, an estimate of a representative peak amplitude value $A_{PR}$ is achieved on the basis of the values ($r_g$, g) and ($r_h$, h). This will be explained in further detail below in connection with FIG. 15A.

Setting parameters n=5, R=10, and $q_1$=1 in step S200 renders g=50. Hence the measuring session includes 50 revolutions (since n*R=50), and setting g=50 implies that we identify the position in the histogram where the 50:th largest detected pulse is stored. Hence, with reference e.g. to the histogram of FIG. 13, we are identifying the position where pulse amplitudes that occur with a frequency of once per revolution will be reflected. Differently worded, it to be understood that, since the distribution of true peak amplitude values emanating from rotation of a monitored rotational part closely follows the normal distribution, then sorting the detected peak amplitude values into amplitude bins r, 500 (See FIGS. 13A, 13B and/or 13C), and then identifying the amplitude bin r, 500 holding the g:th largest detected peak amplitude value, renders identification of an amplitude value $r_g$ which has occurred 50 times (since g=50) during 50 revolutions (since n*R=50), i.e. statistically a peak amplitude of at least the peak amplitude value $r_g$ has occurred g/(n*R) times/revolution, which is once per revolution when g=50 and n*R=50. In other words, the average occurrence frequency $f_{ag}$, expressed as occurrences per revolution, of an amplitude having a value of $r_g$ or higher is:

$f_{ag}=g/(n*R)$ occurrences/revolution

Similarly, setting the parameter $q_2=4$ in step S200 renders h=n*R/$q_2$=12.5. Hence the measuring session includes 50 revolutions (since n*R=50), and setting h=12 implies that we identify the position in the histogram where the 12:th largest detected pulse is stored. Hence we are identifying the position in the histogram of FIG. 13 where pulses that occur with a frequency of once every four revolutions will be reflected. In other words, the average occurrence frequency $f_{ah}$, expressed as occurrences per revolution, of an amplitude having a value of $r_h$ or higher is:

$f_{ah}=h/(n*R)$ occurrences/revolution

When parameters n=5, R=10, and h=n*R/$q_2$=12.5, renders $f_{ah}=h/(n*R)=¼$ occurrences/revolution, i.e. one occurrence every four revolutions As mentioned above, the nature of the Gaussian function or bell curve is such that the amplitude and frequency of low amplitude values actually can tell us something about the amplitude of the not-so-frequent highest peak amplitude values. This is true even if only a part of the amplitude-frequency plot (See FIG. 9, 10, 13A, 13B, 13C) resembles the Gaussian function or bell curve, such as e.g. if the high amplitude part of the plot of detected peak values follows the Gaussian function or bell curve.

Since at least the high amplitude part of the distribution of true peak amplitude values emanating from rotation of a monitored rotational part closely follow the normal distribution, these two positions in the histogram may be used for estimating a peak amplitude value which statistically occurs more seldom. As mentioned above (See heading "Finite Time Period for Peak Value Detection" above), the representative peak amplitude value $A_{PR}$ may be an amplitude which statistically occurs once every R revolutions. Accordingly, having set parameter R to value 10, the method includes estimating the amplitude of a peak value occurring once in ten revolutions, based on the observation of occurrence frequency and amplitude of peaks occurring once per revolution and once in four revolutions. Advantageously, this method enables the rejection of 11 high amplitude false peak values while still enabling the estimation of an accurate representative peak amplitude value $A_{PR}$, when parameters g and h, respectively, are set as mentioned above, i.e. g=50 and h=12.5. Moreover, it is to be noted that this method enables the rejection of 11 high amplitude false peak values while reducing the required measurement session duration $T_{PM}$ to merely the duration of 50 revolutions. This is since n*R=5*10=50. This effect is advantageously achieved since parameters $q_1$ and $q_2$ are selected such that the two parameters g & h are selected to values representing relatively high frequency of occurrence of peak amplitude values, and the amplitudes of the high occurrence frequency values are used for estimating a peak amplitude value $A_{PR}$ which statistically occurs more seldom, such as once in R revolutions. Hence, a representative peak amplitude level $A_{PR}$ having an average occurrence of once every R:th revolution can be estimated on the basis of the peak amplitude levels having an average occurrence of once every g:th revolution and the peak amplitude levels having an average occurrence of once every h:th revolution. The number of rejected noise peaks PNR is one less than the truncated value of h:

$P_{NP}$=TRUNC(h)-1

Accordingly the embodiment according to FIG. 14B enables substantially the same accuracy in estimation of representative peak amplitude value $A_{PR}$ based on measurement during 50 revolutions as the method according to the FIG. 14A embodiment does based on measurement during 120 revolutions (compare with Table 1 above). The below Table 2 illustrates a few examples of combinations of parameter settings for R and n, together with resulting duration of measuring session and the corresponding capability of noise rejection.

TABLE 2

| R | n | Duration of measurement session (revolutions) | Parameter q2 | Parameter h = (n*R)/q2 | Number of rejected noise peaks |
|---|---|---|---|---|---|
| 8 | 5 | 40 | 4 | 10 | 9 |
| 9 | 5 | 45 | 4 | 11.25 | 10 |
| 10 | 5 | 50 | 4 | 12.5 | 11 |
| 10 | 6 | 60 | 4 | 15 | 14 |
| 10 | 7 | 70 | 4 | 17.5 | 16 |
| 10 | 8 | 80 | 4 | 20 | 19 |
| 10 | 9 | 90 | 4 | 22.5 | 21 |
| 10 | 10 | 100 | 4 | 25 | 24 |
| 10 | 11 | 110 | 4 | 27.5 | 26 |
| 10 | 12 | 120 | 4 | 30 | 29 |
| 10 | 13 | 130 | 4 | 32.5 | 31 |
| 10 | 14 | 140 | 4 | 35 | 34 |
| 9 | 6 | 54 | 4 | 13.5 | 12 |
| 9 | 7 | 63 | 4 | 15.75 | 14 |
| 9 | 8 | 72 | 4 | 18 | 17 |
| 9 | 9 | 81 | 4 | 20.25 | 19 |
| 9 | 10 | 90 | 4 | 22.5 | 21 |
| 9 | 11 | 99 | 4 | 24.75 | 23 |
| 9 | 12 | 108 | 4 | 27 | 26 |

According to an embodiment of the invention, the estimation may be performed by producing an accumulated histogram table reflecting all amplitudes detected in a measurement session and their frequency of occurrence. FIG. 13C is an illustration of such a cumulative histogram table 530 corresponding to the histogram table of FIG. 13B. The cumulative histogram table of FIG. 13C includes the same number of amplitude range bins as the FIG. 13B table. In the cumulative histogram the occurrence N' is reflected as the number of occurrences of detected peaks having an amplitude higher than the amplitude $A_r'$ of associated amplitude bin r. This advantageously provides for a smoother curve when the cumulative histogram is plotted. Whereas the 'ordinary' histogram reflecting a limited number of observations will reflect a lack of observations Nat an amplitude bin as a notch or dent at that bin, the cumulative histogram will provide a smoother curve, which makes is more suitable for use in estimating occurrence at one amplitude level based on the observation of occurrences at other amplitude levels.

According to an embodiment of the invention, the amplitude levels are reflected as logarithmic values, and also the cumulative occurrence is reflected by the logarithmic value of the cumulative occurrence.

Figure 15A:
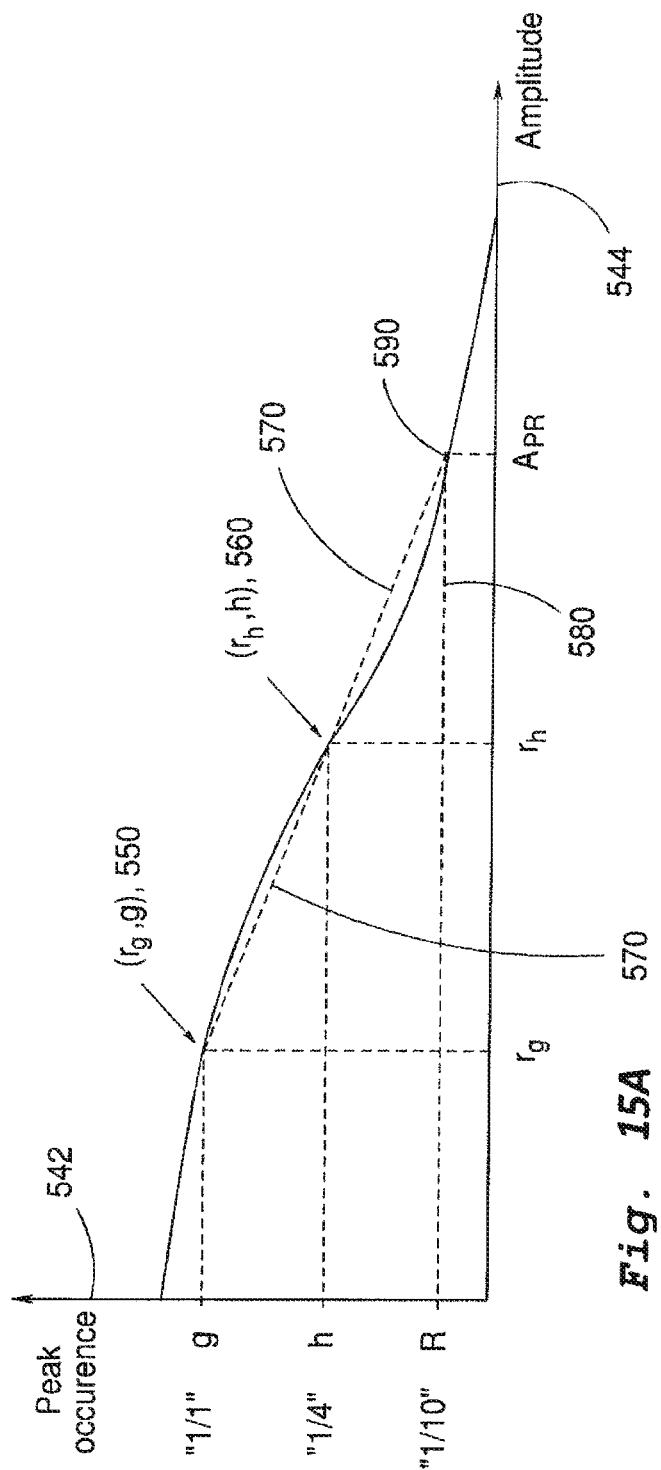
FIG. 15A is an illustration reflecting the principle of a cumulative histogram resulting from a measurement.

FIG. 15A is an illustration reflecting the principle of a cumulative histogram resulting from a measurement, and corresponding to the table of FIG. 13C. Although a cumulative histogram using real detected values may take a different shape from that shown in FIG. 15A, the principle of estimating the representative peak amplitude $A_{PR}$, reflecting the amplitude level which occurs once every R:th revolution, is illustrated in FIG. 15A.

One axis 542 of the cumulative histogram reflects occurrence, and the other axis 544 reflects amplitude. When n=5, R=10, q1=1 then g=50 representing 50 occurrences, which also corresponds to one occurrence per revolution. One occurrence per revolution may be written: "1/1". Accordingly, the axis 542 of the cumulative histogram reflecting occurrence may reflect g as "1/1". Similarly h may reflect an occurrence of one in four also expressed as "¼", and when R=10, then R may reflect an occurrence of one in ten also expressed as "1/10" (See FIG. 15A).

Parameter values rg, g and rh, h, may be determined in the manner described above in connection with FIG. 14B. Parameter values rg, g reflects a point 550 in the cumulative histogram indicating peaks that occur once per revolution. Parameter values rh, h reflects a point 560 in the cumulative histogram indicating peaks that occur once per four revolutions. The inventor realized that in the logarithmic cumulative histogram this part of the normal distribution curve closely resembles a straight line, making it possible to draw a straight line 570 through points 550 and 560. When that line 570 is extended it will cross a line 580 representing the R-occurrence at a point 590. The amplitude value of point 590 represents the amplitude level $A_{PR}$ which occurs once every R:th revolution. Hence, a representative peak amplitude level $A_{PR}$ having an average occurrence of once every R:th revolution can be estimated on the basis of the peak amplitude levels having an average occurrence of once every g:th revolution and the peak amplitude levels having an average occurrence of once every h:th revolution. FIG. 15A illustrates this, with example values g=1, h=4 and R=10.

On the basis of testing, the inventor established that the parameter q1 should advantageously have a value of no less than one (1), since selecting the parameter q1 to less than one may lead to poor results in the estimation process because a cumulative histogram reflecting a bearing assembly having an outer ring damage deviates comparatively more from a straight line, thereby rendering a larger error in the estimation.

Accordingly, an embodiment of the invention includes a method of operating an apparatus for analysing the condition of a machine having a part rotating with a speed of rotation $f_{ROT}$ comprising the steps of:

receiving a first digital signal $S_{MD}$, $S_R$, $S_F$ dependent on mechanical vibrations emanating from rotation of said part;

detecting peak amplitude values Ap occurring in said first digital signal during a finite time period $T_{Pm}$, said finite time period corresponding to a certain amount of revolution of said rotatable part; said certain amount of revolution corresponding to more than one revolution of said monitored rotatable part;

sorting each said detected peak amplitude value Ap into a corresponding amplitude bin 500, $r_1$-$r_{750}$ (See FIGS. 13B and 13C) so as to reflect occurrence N of detected peak amplitude values Ap within a plurality Nri of amplitude ranges;

estimating a representative peak amplitude value $A_{PR}$ in dependence on said sorted peak amplitude values Ap and said certain amount of revolution; wherein said certain amount of revolution includes at least R revolutions, and wherein the estimation step includes estimating an amplitude value $A_{PR}$, which occurs on average substantially once per R revolutions, in dependence of detected amplitude levels $A_p$ which on average occur more frequently than once per R revolutions.

According to an embodiment of the above solution, said certain amount of revolution includes at least n*R revolutions, wherein n is a number having a numerical value of at least 1 and R has a numerical value of at least 8.

According to another embodiment, n is a number having a numerical value of at least 2 and R has a numerical value of at least 8.

According to an embodiment there is provided a method of operating an apparatus for analysing the condition of a machine having a part rotating with a speed of rotation $f_{ROT}$ comprising the steps of:

receiving a first digital signal $S_{MD}$, $S_R$, $S_F$ dependent on mechanical vibrations emanating from rotation of said part;

detecting peak amplitude values Ap occurring in said first digital signal during a finite time period $T_{Pm}$, said finite time period corresponding to a certain amount of revolution of said rotatable part; said certain amount of revolution corresponding to more than one revolution of said monitored rotatable part;

sorting each said detected peak amplitude value Ap into a corresponding amplitude bin 500, $r_1$-$r_{750}$ (See FIGS. 13B and 13C) so as to reflect occurrence N of detected peak amplitude values Ap within a plurality $N_R$ of amplitude ranges;

estimating a representative peak amplitude value $A_{PR}$ in dependence on said sorted peak amplitude values Ap and said certain amount of revolution; wherein said certain amount of revolution includes at least n*R revolutions, wherein n is a number having a numerical value of at least two and R has a numerical value of at least 8, and wherein the estimation step includes estimating an amplitude value $A_{PR}$ which occurs on average substantially once per R revolutions in dependence of detected amplitude levels $A_p$ which occur once every h:th revolution, wherein h has a numerical value of less than n*R. According to an aspect of this solution, the estimation step includes estimating an amplitude value $A_{PR}$ which occurs on average substantially once per R revolutions in dependence of detected amplitude levels $A_p$ which occur once every h:th revolution, wherein h has a numerical value of less than n*R and in dependence of detected amplitude levels $A_p$ which occur once every g:th revolution, wherein g has a numerical value of less than h.

An embodiment of the invention includes a method of operating an apparatus for analysing the condition of a machine having a part rotating with a speed of rotation $f_{ROT}$ comprising the steps of:

receiving a first digital signal $S_{MD}$, $S_R$, $S_F$ dependent on mechanical vibrations emanating from rotation of said part;

detecting peak amplitude values Ap occurring in said first digital signal during a finite time period $T_{Pm}$, said finite time period corresponding to a certain amount of revolution of said rotatable part; said certain amount of revolution corresponding to more than one revolution of said monitored rotatable part;

sorting each said detected peak amplitude value Ap into a corresponding amplitude bin 500, $r_1$-$r_{750}$ (See FIGS. 13B and 13C) so as to reflect occurrence N of detected peak amplitude values Ap within a plurality Nri of amplitude ranges;

estimating a representative peak amplitude value $A_{PR}$ in dependence on said sorted peak amplitude values Ap and said certain amount of revolution; wherein said certain amount of revolution includes at least n*R revolutions, and wherein the estimation step includes estimating an amplitude value $A_{PR}$, which occurs on average substantially once per R revolutions, in dependence of detected amplitude levels $A_P$ which on average occur more frequently than once per R revolutions.

This solution advantageously provides repeatable results since the delivered amplitude level $A_{PR}$ is based on measured values having a high occurrence frequency. Moreover, the delivered amplitude level $A_{PR}$ is substantially the highest measurable amplitude level detectable from a rotating machine part during a finite time period $T_{Pm}$, as discussed above and as shown by tests performed by the inventor.

Noise Echo Suppression

Moreover, the inventor realized that impact noise in industrial environments, which may be caused by an item hitting the body of the machine having a monitored rotating part 8, may cause shock waves which travel back and forth, echoing in the body of the machine. Accordingly, such echoing shock waves may be picked up by the sensor 10 (FIG. 1, 2A, 5) and reflected in the resulting signal $S_R$, $S_{MDP}$ (FIG. 6B, 7) as a burst of amplitude peaks.

Hence, such a burst of amplitude peaks may unfortunately cause corruption of a peak level analysis, unless the impact of such bursts can be reduced or eliminated.

FIG. 12B is a flow chart illustrating an embodiment of a method of performing step S70 (FIG. 11B) so as to perform the peak level measurement session and additionally addressing the impact of bursts of noise amplitude peaks.

Step S300 of the method embodiment illustrated in FIG. 12B may be performed after step S60, as described in connection with FIG. 11B above. In step S300 the peak level analyzer reads the current rotational speed $f_{ROT}$ which may be delivered from the speed detector 450, as described above (See FIG. 5). The reading of a real time value of the rotational speed $f_{ROT}$ advantageously enables this method to be performed also when the rotational part to be analysed rotates with a variable speed of rotation.

In a step S310 an echo suppression period $T_{es}$, is calculated. The echo suppression period $T_{es}$ is set to:

$T_{es}:=1/(e*f_{ROT})$

Wherein, according to an embodiment, e is a factor having a value equal to ten or less than ten:

$e<=10$

An effect of the echo suppression method is to reduce the number of peak values per revolution of the monitored part 8 to a maximum of e peaks per revolution. Accordingly, selecting e=10 renders a maximum delivery of 10 peaks per revolution. Differently worded the echo suppression period $T_{es}$ will have a duration corresponding to the duration of one tenth revolution, when e=10. The factor e may be set to another other value, such as e.g. 8 or 12.

In a step S320 the measurement signal $S_{MDP}$, $S_R$ to be analyzed is received, and in a step S330 the amplitude of the received signal $S_R$ is analyzed so as to detect any received peak values.

In a step S340 any detected peak values $A_p$ are delivered at a frequency of $f_{es}$ or less, wherein each delivered peak amplitude value reflects the highest detected amplitude during the echo suppression period $T_{es}$. This is done so that there may be longer time than one echo suppression period $T_{es}$ between two consecutively delivered output values from the echo suppresser, but the period between two consecutively delivered output values from the echo suppresser will never be shorter than the echo suppression period $T_{es}$.

In a subsequent step S350, the peak values $A_p$ delivered by the echo suppresser are received by a log generator. The log generator calculates the logarithm of the peak value $A_p$ in real time.

In a step S360 the amplitude bin corresponding to the relevant peak value $A_p$ is identified in a histogram table 470 and/or 530 (See histogram table 470 and cumulative histogram table 530 in FIGS. 13B and 13C, respectively), and in a step S370 the corresponding occurrence counter value $N_{ri}$, $N_{ri}'$ is increased by one unit.

Figure 16:
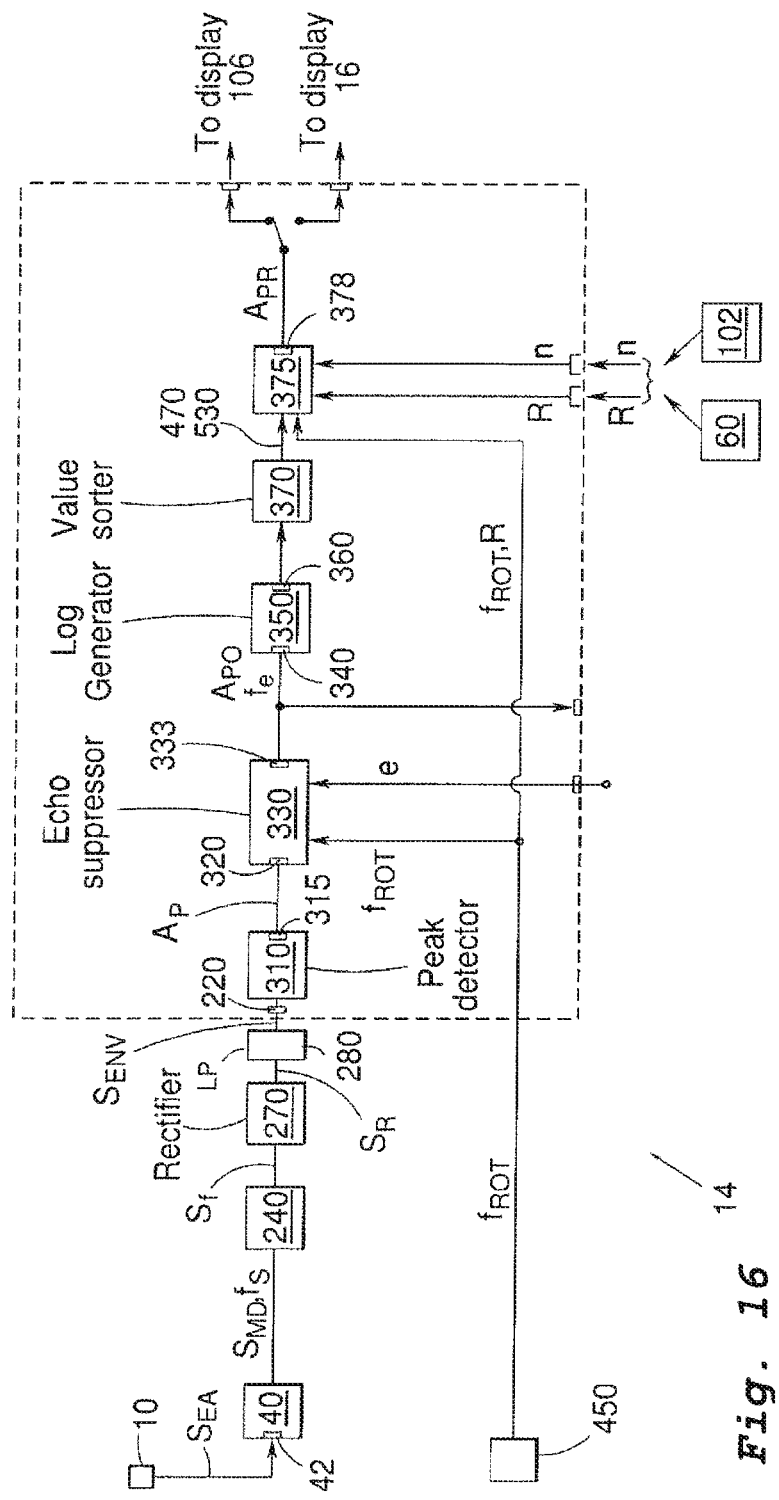
FIG. 16 is a schematic block diagram of an embodiment of the analysis apparatus.

FIG. 16 is a schematic block diagram of an embodiment of the analysis apparatus 14. A sensor unit 10 is adapted to generate an analogue signal $S_{EA}$ in response to vibrations, as described above in this document. The sensor unit 10 may be a vibration sensor as discussed in connection with FIG. 2B above. Alternatively, the sensor unit 10 may be a resonant Shock Pulse Measurement sensor 10 having a mechanical resonance frequency $f_{RM}$, as discussed in connection with FIG. 2B above. This mechanical resonance feature of the Shock Pulse Measurement sensor advantageously renders repeatable measurement results in that the output signal from a Shock Pulse Measurement sensor has a stable resonance frequency substantially independent of the physical path between the shock pulse signal source and the shock pulse sensor.

The analogue signal $S_{EA}$ may be delivered to input 42 of A/D converter 40 which is adapted to generate a digital signal $S_{MD}$ having a sampling frequency $f_S$, as discussed above. The digital signal $S_{MD}$ may be delivered to a band pass filter 240 generating a filtered signal $S_F$ in response thereto. The filtered signal $S_F$ may be delivered to a rectifier 270, as discussed above in connection with FIG. 6B, delivering a rectified signal $S_R$ having sampling frequency $f_S$. The rectified signal $S_R$ may optionally be delivered to a low pass filter 280 so as to produce a digital envelop signal $S_{ENV}$ having sampling frequency $f_S$, as discussed above.

According to an embodiment, the digital envelop signal $S_{ENV}$ may be delivered to an input 220 of evaluator 230, as discussed above in connection with FIG. 6B and FIG. 7 (See also FIG. 16). The digital envelop signal $S_{ENV}$ may be delivered to an input of a peak detector 310. The peak detector 310 may operate to deliver detected signal peaks or detected signal peak values Ap to an output 315 in response to the digital envelop signal $S_{ENV}$. As mentioned above, digital signal processing may advantageously be performed by the data processor 50 running program code for causing the data processor 50 to perform the digital signal processing. According to an embodiment of the invention the processor 50 is embodied by a Digital Signal Processor, DSP 50. The DSP 50 advantageously operates sufficiently fast to enable execution of the described digital signal processing on received signal SENv having the same or substantially the same sampling frequency $f_S$ as delivered by A/D converter 40. The feature of performing the signal processing on signals at the sampling frequency $f_S$ ensures advantageously accurate peak value detection. It may also be possible to provide a decimator before the peak value detector so as to detect peak values on a decimated signal having a lower sampling frequency. However, tests performed by the inventor indicate that performing peak value detection on a signal at the higher sampling frequency $f_S$ advantageously ensures more accurate peak value detection.

The detected signal peaks or detected signal peak values Ap may be delivered from the peak detector output 315 to an input 320 of an optional echo suppresser 330. Alternatively, the detected signal peaks or detected signal peak values Ap may be delivered from the peak detector output 315 to an Input 340 of a log generator 350. The log generator 350 is adapted to generate the logarithmic amplitude values corresponding to the amplitude of the received detected signal peaks or detected signal peak values Ap. Hence, an output 360 of log generator 350 is adapted to deliver logarithmic amplitude values. A value sorter 370 is adapted to receive the logarithmic amplitude values and to sort the received the logarithmic amplitude values into amplitude bins corresponding to the received logarithmic amplitude values. Hence, the value sorter 370 may be adapted to deliver sorted amplitude values $A_P$, e.g. in the form of a table 470 or cumulative histogram table 530, as discussed and illustrated in connection with FIGS. 13B and/or 13C above.

A Peak Value Establisher 375 may be adapted to establish a representative peak value $A_{PR}$ in dependence on the sorted peak amplitude values Ap and the certain amount R of revolution of the monitored rotating part. As mentioned above, in connection with FIG. 11B, the detector 450 may generate a signal indicative of the amount of revolution R, and the duration of measurement may be controlled solely in dependence on the amount of revolution of the rotatable part 8, irrespective of time. Alternatively, the duration $T_{Pm}$ of the measurement session may be controlled in dependence of time information provided by the clock 190 (FIG. 5) in conjunction with speed of rotation information $f_{ROT}$ delivered by detector 450 so that the duration $T_{Pm}$ is adapted to ensure that the monitoring is performed for the desired amount of rotation n*R. In this connection it is noted that R is a positive number larger than one, and n is a positive number equal to one (1) or larger than one (1). The parameter R may be an integer, but it may alternatively be a decimal number. As discussed above, the parameter values R and n may be preset by the manufacturer of apparatus 14, and these values may be stored in the non-volatile memory 52 or in the non-volatile memory 60 (See FIG. 2A). Alternatively, the parameter values R and n may be set by the user of the apparatus 14 prior to performing a measurement session, as discussed in connection with FIG. 11A above. The parameter values R and n may be set by the user by means of the user interface 102, 107 described in connection with FIG. 2A.

The Peak Value Establisher 375 may be adapted to deliver the representative peak value $A_{PR}$ on an output 378 (See FIG. 16) allowing the generated representative peak value $A_{PR}$ to be delivered to display 106 or to port 16.

Accordingly, with reference to FIG. 16, an embodiment of the apparatus 14 includes a peak detector 310 co-operating with log generator 350, a value sorter 370 and a Representative Peak Value Establisher 375 so as to perform the method described in connection with FIGS. 11A, 118 and 12A above.

According to a preferred embodiment, the apparatus 14 also includes an echo suppresser 330, as discussed above in connection with FIG. 16. The echo suppresser 330, also referred to as burst rejector 330, may be coupled to receive the detected peak values $A_P$ from peak detector 310. The apparatus 14 including burst rejector 330 may be adapted to perform the method described in connection with FIG. 12B. Hence, burst rejector 330 may be adapted to deliver output peak values $A_{PO}$ on a burst rejector output 333 in response to received detected peak values $A_P$. The burst rejector 330 may be adapted to control the delivery of said output peak values $A_{PO}$ such that said output peak values $A_{PO}$ are delivered at a delivery frequency $f_{es}$, wherein the delivery frequency $f_{es}=e*f_{ROT}$, wherein $f_{ROT}$ is said speed of rotation, and e is a factor having a predetermined value.

What is claimed is:

1. A method of detecting a mechanical operating condition of a bearing assembly surface included in a rotating component of a machine, the method comprising:
   monitoring the rotating component with a vibration sensor for a plurality of revolutions;
   determining a plurality of peak values from a signal responsive to the monitoring with the vibration sensor;
   sorting the plurality of peak values determined from the monitoring according to amplitude of said plurality of peak values;
   filtering out one or more noise peak values from the sorted plurality of peak values;
   identifying, with one or more hardware processors, a representative peak value that has an occurrence frequency of less than once per revolution, wherein the representative peak value indicates the mechanical operating condition of the bearing assembly surface and wherein the identification is based on an assumption that
   the sorted plurality of peak values follow a Gaussian distribution, and
   the representative peak value occurs between a mean value and a highest value of the sorted plurality of peak values after the filtering; and
   determining the mechanical operating condition based on the identified representative peak value.

2. The method of claim 1, wherein a position of the representative peak value with respect to the sorted plurality of peak values is predetermined.

3. The method of claim 1, wherein said filtering includes rejecting one or several of the highest values of the sorted plurality of peak values before the filtering.

4. The method of claim 1, further comprising counting a number of revolutions during which the plurality of peak values were determined, wherein said filtering includes rejecting a certain number of the highest values of the sorted plurality of peak values before the filtering, said certain number being based on the counted number of revolutions.

5. The method of claim 1, further comprising counting a number of revolutions during which the plurality of peak values were determined, wherein said filtering includes rejecting a certain number of the highest values of the sorted plurality of peak values before the filtering, said certain number of rejected values being fewer than counted number of revolutions.

6. The method of claim 1, wherein said plurality of revolutions includes at least eight revolutions.

7. The method of claim 1, wherein said sorting includes sorting the plurality of peak values determined from the monitoring according to amplitude of said plurality of peak values into a histogram having a number of amplitude bins, wherein an amplitude bin has an occurrence variable, and increasing the relevant amplitude bin occurrence variable when a peak value is sorted into the relevant amplitude bin.

8. The method of claim 1, wherein the rotating component has a rotational speed of 50 revolutions per minute or less.

9. The method of claim 1, wherein the determining of the plurality of peak values includes:
detecting a plurality of peak values from a signal responsive to the monitoring with the vibration sensor; and
filtering out one or more noise peak values from the detected plurality of peak values from the monitoring before the sorting.

10. The method of claim 9, further comprising:
determining a speed of rotation of the rotating component;
wherein the filtering before the sorting includes limiting the number of determined peak values dependent on the speed of rotation.

11. The method of claim 9, further comprising
the filtering before the sorting includes limiting the number of determined peak values so that less than a first number of peak values are determined per revolution of the rotating component, wherein the first number of peak values is stored as constant in a memory.

12. The method of claim 11, wherein the filtering before the sorting includes establishing an echo suppression period and limiting the number of determined peak values to one per echo suppression period.

13. The method of claim 12, wherein the filtering before the sorting includes establishing a highest detected peak value from among a number of detected peak values during the echo suppression period, and wherein said one determined peak value per echo suppression period reflects said highest detected peak value.

14. A system of detecting a mechanical operating condition of a bearing assembly surface included in a rotating component of a machine, the system comprising one or more hardware processors configured to:
monitor the rotating component during a plurality of revolutions to generate a vibration signal;
determine a plurality of peak values from the vibration signal;
sort the plurality of peak values according to amplitude of said plurality of peak values;
filtering out one or more noise peak values from the sorted plurality of peak values;
identify, with one or more hardware processors, a representative peak value that has an occurrence frequency of less than once per revolution, wherein the representative peak value indicates the mechanical operating condition of the bearing assembly; and
determine the operating condition based the identified representative peak value.

15. The system of claim 14, wherein said filtering includes rejecting one or several of the highest values of the sorted plurality of peak values before the filtering.

16. The system of claim 14, wherein the one or more hardware processors are further configured to count a number of revolutions during which the plurality of peak values were determined, wherein said filtering includes rejecting a certain number of the highest values of the sorted plurality of peak values before the filtering, said certain number being based on the counted number of revolutions.

17. The system of claim 14, wherein the one or more hardware processors are further configured to count a number of revolutions during which the plurality of peak values were determined, wherein said filtering includes rejecting a certain number of the highest values of the sorted plurality of peak values before the filtering, said certain number of rejected values being fewer than counted number of revolutions.

18. The system of claim 14, wherein said plurality of revolutions includes at least eight revolutions.

19. The system of claim 14, wherein said sorting includes sorting the plurality of peak values determined from the monitoring according to amplitude of said plurality of peak values into a histogram having a number of amplitude bins, wherein an amplitude bin has an occurrence variable, and increasing the relevant amplitude bin occurrence variable when a peak value is sorted into the relevant amplitude bin.

* * * * *